(12) United States Patent
Uygun et al.

(10) Patent No.: US 10,918,102 B2
(45) Date of Patent: Feb. 16, 2021

(54) DEVICES AND METHODS TO IMPROVE AND ASSESS VIABILITY OF HUMAN LIVERS

(71) Applicant: THE GENERAL HOSPITAL CORPORATION, Boston, MA (US)

(72) Inventors: Mustafa Korkut Uygun, Boston, MA (US); Bote G. Bruinsma, Amsterdam (NL); Maria-Louisa Izamis, Eindhoven (NL)

(73) Assignee: The General Hospital Corporation, Boston, MA (US)

( * ) Notice: Subject to any disclaimer, the term of this patent is extended or adjusted under 35 U.S.C. 154(b) by 0 days.

(21) Appl. No.: 15/125,918

(22) PCT Filed: Mar. 13, 2015

(86) PCT No.: PCT/US2015/020336
§ 371 (c)(1),
(2) Date: Sep. 13, 2016

(87) PCT Pub. No.: WO2015/138832
PCT Pub. Date: Sep. 17, 2015

(65) Prior Publication Data
US 2017/0000110 A1    Jan. 5, 2017

Related U.S. Application Data

(60) Provisional application No. 61/952,461, filed on Mar. 13, 2014.

(51) Int. Cl.
*A01N 1/02*    (2006.01)

(52) U.S. Cl.
CPC ......... *A01N 1/0247* (2013.01); *A01N 1/0226* (2013.01)

(58) Field of Classification Search
CPC .......................... A01N 1/0247; A01N 1/0226
See application file for complete search history.

(56) References Cited

U.S. PATENT DOCUMENTS

| 1,682,344 A | 8/1928 | Lesieur |
| 1,916,658 A | 7/1933 | Davidson |
| (Continued) | | |

FOREIGN PATENT DOCUMENTS

| EP | 1246903 B1 | 10/2002 |
| KR | 20010002227 A | 1/2001 |
| (Continued) | | |

OTHER PUBLICATIONS

Cypel et al., "Normothermic Ex Vivo Perfusion Prevents Lung Injury Compared to Extended Cold Preservation for Transplantation", American Journal of Transplantation 9:2262-2269 (2009).
(Continued)

*Primary Examiner* — Michael L Hobbs
(74) *Attorney, Agent, or Firm* — Fish & Richardson P.C.

(57) ABSTRACT

The present invention relates to organ perfusion systems that can be used at room temperature. The organ perfusion systems do not comprise a temperature controller. In some embodiments, the organ perfusion systems do not comprise a cleaning device for cleaning the perfusion fluid. The perfusion fluid can comprise Williams' medium E. The organ perfusion systems can be portable and can be used to preserving an organ, preventing ischemic damage in an organ, or recovering an ischemically damaged organ.

20 Claims, 8 Drawing Sheets

(56) References Cited

U.S. PATENT DOCUMENTS

| | | | |
|---|---|---|---|
| 3,183,961 A | 5/1965 | Brandt | |
| 3,406,531 A | 10/1968 | Swenson et al. | |
| 3,468,136 A | 9/1969 | Swenson et al. | |
| 3,545,221 A | 12/1970 | Swenson et al. | |
| 3,607,646 A | 9/1971 | De Roissart | |
| 3,660,241 A | 5/1972 | Michielsen | |
| 3,738,914 A | 6/1973 | Knudson et al. | |
| 3,772,153 A | 11/1973 | De Roissart | |
| 3,810,367 A | 5/1974 | Peterson | |
| 3,843,455 A | 10/1974 | Bier | |
| 3,877,843 A | 4/1975 | Fischel | |
| 3,881,990 A | 5/1975 | Burton et al. | |
| 3,914,954 A | 10/1975 | Doerig | |
| 3,995,444 A | 12/1976 | Clark et al. | |
| 4,186,565 A | 2/1980 | Toledo-Pereyra | |
| 4,242,883 A | 1/1981 | Toledo-Pereyra | |
| 4,745,759 A | 5/1988 | Bauer et al. | |
| 4,798,824 A | 1/1989 | Belzer et al. | |
| 5,356,771 A | 10/1994 | O'Dell | |
| 6,046,046 A * | 4/2000 | Hassanein | A01N 1/0247 435/284.1 |
| 6,524,785 B1 | 2/2003 | Cozzone et al. | |
| 7,410,474 B1 * | 8/2008 | Friend | A01N 1/0247 435/284.1 |
| 7,504,201 B2 | 3/2009 | Taylor et al. | |
| 7,572,622 B2 | 8/2009 | Hassanein et al. | |
| 7,651,835 B2 | 1/2010 | Hassanein et al. | |
| 7,691,622 B2 | 4/2010 | Garland et al. | |
| 7,749,693 B2 | 7/2010 | Brassil et al. | |
| 7,811,808 B2 | 10/2010 | Van Der Plaats et al. | |
| 7,824,848 B2 | 11/2010 | Owen et al. | |
| 8,268,612 B2 | 9/2012 | Owen et al. | |
| 8,287,580 B2 | 10/2012 | Rakhorst et al. | |
| 8,323,954 B2 | 12/2012 | Kravitz et al. | |
| 8,440,390 B2 | 5/2013 | Brockbank | |
| 8,765,364 B2 | 7/2014 | Curtis et al. | |
| 8,771,930 B2 | 7/2014 | Curtis et al. | |
| 8,927,257 B2 | 1/2015 | Hutzenlaub et al. | |
| 8,986,978 B2 | 3/2015 | Brassil | |
| 9,078,428 B2 | 7/2015 | Hassanein et al. | |
| 9,215,867 B2 | 12/2015 | Hassanein et al. | |
| 9,247,728 B2 | 2/2016 | Fishman et al. | |
| 2003/0073227 A1 * | 4/2003 | Hull | A01N 1/02 435/284.1 |
| 2004/0058432 A1 | 3/2004 | Owen et al. | |
| 2005/0147958 A1 | 7/2005 | Hassanein et al. | |
| 2005/0221269 A1 | 10/2005 | Taylor et al. | |
| 2007/0009881 A1 | 1/2007 | Arzt et al. | |
| 2007/0042339 A1 | 2/2007 | Toner et al. | |
| 2008/0096184 A1 | 4/2008 | Brasile | |
| 2008/0234768 A1 | 9/2008 | Hassanein et al. | |
| 2008/0288399 A1 | 11/2008 | Curtis et al. | |
| 2009/0123437 A1 | 5/2009 | Takebe | |
| 2011/0183310 A1 * | 7/2011 | Kravitz | A01N 1/02 435/1.2 |
| 2014/0030231 A1 | 1/2014 | Yarmush et al. | |
| 2015/0322404 A1 | 11/2015 | Yarmush et al. | |

FOREIGN PATENT DOCUMENTS

| | | | |
|---|---|---|---|
| WO | 2007/025233 A1 | 3/2007 | |
| WO | 2008/024195 A2 | 2/2008 | |
| WO | WO 2011/002926 | 1/2011 | |
| WO | WO-2011140241 A2 * | 11/2011 | A01N 1/0226 |

OTHER PUBLICATIONS

Izamis, "Ex vivo Perfusion Optimization of Donor Liver Grafts for Transplantation and Cell Isolation", Massachusetts Institute of Technology 193-222 (2010).

Tolboom et al., "Recovery of Warm Ischemic Rat Liver Grafts by Normothermic Extracorporeal Perfusion", Transplantation 87(2):170-177 (2009).

Sugimachi et al., "Nonmetabolizable Glucose Compounds Impart Cryotolerance to Primary Rat Hepatocytes", Tissue Engineering 12(3):579-588 (2006).

Berendsen et al., "Hepatocyte viability and ATP content decrease linearly over time during conventional cold storage of rat liver grafts", Transplantation Proceedings 43(5):1484-1488 (2011).

Berendsen et al., "A simplified subnormothermic machine perfusion system restores ischemically damaged liver grafts in a rat model of orthotopic liver transplantation", Transplantation Research 0:6 (2012). (10 pages).

Bessems et al., "Improved Machine Perfusion Preservation of the Non-Heart-Beating Donor Rat Liver Using Polysol: A New Machine Perfusion Preservation Solution", Liver Transplantation 11(11):1379-1388 (2005).

Bessems et al., "Machine Perfusion Preservation of the Pig Liver Using a New Preservation Solution, Polysol", Transplantation Proceedings 38:1238-1242 (2006).

Brockmann et al., "Normothermic Perfusion: A New Paradigm for Organ Preservation", Annals of Surgery 250 (1):1-6 (2009).

Bruinsma et al., "Determination and Extension of the Limits to Static Cold Storage with Subnormothermic Machine Perfusion", The International Journal of Artificial Organs 36(11):775-780 (2013).

Buis et al., "Altered bile composition after liver transplantation is associated with the development of nonanastomotic biliary strictures", Journal of Hepatology 50:69-79 (2009).

Butler et al., "Successful Extracorporeal Porcine Liver Perfusion for 72 Hr", Transplantation 73(8):1212-1218 (2002).

Chen et al., "Effective Application of ET-Kyoto Solution for Clinical Lung Transplantation", Transplantation Proceedings 36:2812-2815 (2004).

De Rougemont et al., "One Hour Hypothermic Oxygenated Perfusion (HOPE) Protects Nonviable Liver Allografts Donated After Cardiac Death", Annals of Surgery 250(5):674-683 (2009).

De Vera et al., "Liver Transplantation Using Donation After Cardiac Death Donors: Long-Term Follow-Up from a Single Center", American Journal of Transplantation 9:773-781 (2009).

Donato et al., "Liver Grafts Preserved in Celsior Solution As Source of Hepatocytes for Drug Metabolism Studies: Comparison With Surgical Liver Biopsies", Drug Metabolism and Disposition 33(1):108-114 (2005).

Dutkowski et al., "HOPE for human liver grafts obtained from donors after cardiac death", Journal of Hepatology 60:765-772 (2014).

Fahy et al., "Cryopreservation of Complex Systems: The Missing Link in the Regenerative Medicine Supply Chain", Rejuvenation Research 9(2):279-291 (2006).

Ferrigno et al., "Machine perfusion at 20°C reduces preservation damage to livers from non-heart beating donors", Cryobiology 62:152-158 (2011).

Friend et al., "Normothermic Perfusion of the Isolated Liver", Transplantation Proceedings 33:3436-3438 (2001).

Geuken et al., "Rapid increase of bile salt secretion is associated with bile duct injury after human liver transplantation", Journal of Hepatology 41:1017-1025 (2004).

Giknis et al., "Clinical Laboratory Parameters for the Crl:CD(SD) Rats", Charles River Laboratories 1-14 (2006).

Guarrera et al., "Hypothermic Machine Preservation in Human Liver Transplantation: The First Clinical Series", American Journal of Transplantation 10:372-381 (2010).

Guibert et al., "Organ Preservation: Current Concepts and New Strategies for the Next Decade", Transfusion Medicine and Hemotherapy 38:125-142 (2011).

Hertl et al., "Evidence of Preservation Injury to Bile Ducts by Bile Salts in the Pig and Its Prevention by Infusions of Hydrophilic Bile Salts", Hepatology 21(4):1130-1137 (1995).

Hoekstra et al., "Bile Salt Toxicity Aggravates Cold Ischemic Injury of Bile Ducts After Liver Transplantation in Mdr2 +/- Mice+", Hepatolgy 43(5):1022-1031 (2006).

Hohenester et al., "A Biliary HCO3- Umbrella Constitutes a Protective Mechanism Against Bile Acid-Induced Injury in Human Cholangiocytes", Hepatology 55(1):173-183 (2012).

(56) References Cited

OTHER PUBLICATIONS

Hughes et al., "Isolation of Hepatocytes from Livers from Non-Heart-Beating Donors for Cell Transplantation", Liver Transplantation 12:713-717 (2006).
Imber et al., "Optimisation of Bile Production during Normothermic Preservation of Porcine Livers", American Journal of Transplantation 2:593-599 (2002).
Jain et al., "Long-Term Survival After Liver Transplantation in 4,000 Consecutive Patients at a Single Center", Annals of Surgery 232(4):490-500 (2000).
Kamiike et al., "Adenine Nucleotide Metabolism and Its Relation to Organ Viability in Human Liver Transplantation", Transplantation 45(1):138-143 (1988).
Koetting et al., "Donation After Cardiac Death: Dynamic Graft Reconditioning During or After Ischemic Preservation?", Artificial Organs 35(6):565-571 (2011).
Lanir et al., "Hepatic Transplantation Survival: Correlation with Adenine Nucleotide Level in Donor Liver", Hepatology 8(3):471-475 (1988).
Lee et al., "Metabolic Flux Analysis of Postburn Hepatic Hypermetabolism", Metabolic Engineering 2:312-327 (2000).
Luer et al., "Role of oxygen during hypothermic machine perfusion preservation of the liver", Transplant International 23:944-950 (2010).
McCord, "Oxygen-Derived Free Radicals in Postischemic Tissue Injury", The New England Journal of Medicine 312(3):159-163 (1985).
McCormack et al., "Use of Severely Steatotic Grafts in Liver Transplantation: A Matched Case-Control Study", Annals of Surgery 246(6):940-948 (2007).
Minor et al., "Fibrinolysis in organ procurement for transplantation after cardiocirculatory compromise", Thrombosis and Haemostasis 90:361-362 (2003).
Minor et al., "Controlled Oxygenated Rewarming of Cold Stored Liver Grafts by Thermally Graduated Machine Perfusion Prior to Reperfusion", American Journal of Transplantation 13:1450-1460 (2013).
Mitchell et al., "Energy Metabolism Following Prolonged Hepatic Cold Preservation: Benefits of Interrupted Hypoxia on the Adenine Nucleotide Pool in Rat Liver", Cryobiology 39:130-137 (1999).
Miyagi et al., "The Significance of Preserving the Energy Status and Microcirculation in Liver Grafts From Non-Heart-Beating Donor", Cell Transplantation 17:173-178 (2008).
Monbaliu et al., "Preserving the Morphology and Evaluating the Quality of Liver Grafts by Hypothermic Machine Perfusion: A Proof-of-Concept Study Using Discarded Human Livers", Liver Transplantation 18(12):1495-1507 (2012).
Moore et al., "Impact of Donor, Technical, and Recipient Risk Factors on Survival and Quality of Life After Liver Transplantation", Archives of Surgery 140(3):273-277 (2005).
Nelson et al., "An improved ex vivo method of primary porcine hepatocyte isolation for use in bioartificial liver systems", European Journal of Gastroenterology & Hepatology 12(8):923-930 (2000).
Okamoto et al., "Successful Sub-zero Non-freezing Preservation of Rat Lungs at -2° C Utilizing a New Supercooling Technology", Journal of Heart and Lung Transplantation 27(10):1150-1157 (2008).
Op Den Dries et al., "Ex vivo Normothermic Machine Perfusion and Viability Testing of Discarded Human Donor Livers", American Journal of Transplantation 13:1327-1335 (2013).
Perk et al., "A Metabolic Index of Ischemic Injury for Perfusion-Recovery of Cadaveric Rat Livers", PLoS One 6(12):e28518 (2011). (11 pages).
Perk et al., "A fitness index for transplantation of machine-perfused cadaveric rat livers", BMC Research Notes 5:325 (2012). (7 pages).
Peter et al., "Hepatic Control of Perfusate Homeostasis During Normothermic Extrocorporeal Preservation", Transplantation Proceedings 35:1587-1590 (2003).

Reddy et al., "Preservation of Porcine Non-Heart-Beating Donor Livers by Sequential Cold Storage and Warm Perfusion", Transplantation 77(9):1328-1332 (2004).
Reddy et al., "Non-Heart-Beating Donor Porcine Livers: the Adverse Effect of Cooling", Liver Transplantation 11(1):35-38 (2005).
Sakaguchi et al., "Preservation of Myocardial Function and Metabolism at Subzero Nonfreezing Temperature Storage of the Heart", The Journal of Heart and Lung Transplantation 15(11):1101-1107 (1996).
Schlegel et al., "Hypothermic oxygenated perfusion (HOPE) protects from biliary injury in a rodent model of DCD liver transplantation", Journal of Hepatology 59:984-991 (2013).
Serracino-Inglott et al., "Hepatic ischemia-reperfusion injury", The American Journal of Surgery 181:160-166 (2001).
Shigeta et al., "Impact of Rewarming Preservation by Continuous Machine Perfusion: Improved Post-Transplant Recovery in Pigs", Transplantation Proceedings 45:1684-1689 (2013).
Soltys et al., "Successful Nonfreezing, Subzero Preservation of Rat Liver with 2,3-Butanediol and Type I Antifreeze Protein", Journal of Surgical Research 96(1):30-34 (2001).
St Peter et al., "Extended preservation of non-heart-beating donor livers with normothermic machine perfusion", British Journal of Surgery 89:609-616 (2002).
Taylor et al., "Twenty-Four Hour Hypothermic Machine Perfusion Preservation of Porcine Pancreas Facilitates Processing For Islet Isolation", Transplantation Proceedings 40:480-482 (2008).
Tolboom et al., "A Model for Normothermic Preservation of the Rat Liver", Tissue Engineering 13(8):2143-2151 (2007).
Tolboom et al., "Sequential Cold Storage and Normothermic Perfusion of the Ischemic Rat Liver", Tranplantation Proceedings 40(5):1306-1309 (2008).
Tolboom et al., "Subnormothermic Machine Perfusion at Both 20° C and 30° C Recovers Ischemic Rat Livers for Successful Transplantation", Journal of Surgical Research 175(1):149-156 (2012).
Usta et al., "Supercooling as a Viable Non-Freezing Cell Preservation Method of Rat Hepatocytes", Plos One 8(7):e69334 (2013). (15 pages).
Vairetti et al., "Correlation Between the Liver Temperature Employed During Machine Perfusion and Reperfusion Damage: Role of Ca2+", Liver Transplantation 14:494-503 (2008).
Vajdova et al., "Cold-Preservation-Induced Sensitivity of Rat Hepatocyte Function to Rewarming Injury and Its Prevention by Short-Term Reperfusion", Hepatology 32(2):289-296 (2000).
Vajdova et al., "ATP-Supplies in the Cold-Preserved Liver: A Long-Neglected Factor of Organ Viability", Hepatology 36(6):1543-1552 (2002).
Van Der Plaats et al., "The Groningen Hypothermic Liver Perfusion Pump: Functional Evaluation of a New Machine Perfusion System", Annals of Biomedical Engineering 34(12):1924-1934 (2006).
Vollmar et al., "In vivo quantification of ageing changes in the rat liver from early juvenile to senescent life", Liver 2:330-341 (2002).
Wojcicki et al., "Biliary Tract Complications after Liver Transplantation: A Review", Digestive Surgery 25:245-257 (2008).
Xu et al., "Excorporeal Normothermic Machine Perfusion Resuscitates Pig DCD Livers with Extended Warm Ischemia", Journal of Surgical Research 173(2):e83-e88 (2012).
Zhao et al., "Cell-permeable Peptide Antioxidants Targeted to Inner Mitochondrial Membrane inhibit Mitochondrial Swelling, Oxidative Cell Death, and Reperfusion Injury", The Journal of Biological Chemistry 279(33):34682-34690 (2004).
Bruinsma et al.. "Subnormothermic machine perfusion for ex vivo preservation and recovery of the human liver for transplantation," American Journal of Transplantation, Jun. 2014, 14(6):1400-9.
PCT International Preliminary Report on Patentability in International Appln. No. PCT/US2015/020336, dated Sep. 13, 2016, 5 pages.
PCT International Search Report and Written Opinion in International Appln. No. PCT/US2015/020336, dated Jun. 25, 2015, 7 pages.

* cited by examiner

DEVICES AND METHODS TO IMPROVE AND ASSESS VIABILITY OF HUMAN LIVERS

CROSS-REFERENCE TO RELATED APPLICATION

This application is a 371 National Phase Entry of International Patent Application No. PCT/US2015/020336 filed on Mar. 13, 2015 which claims benefit under 35 U.S.C. § 119(e) of U.S. Provisional Application No. 61/952,461 filed on Mar. 13, 2014, the contents of both of which are incorporated herein by reference in their entireties.

GOVERNMENT SUPPORT

This invention was made with Government support under grant numbers DK080942 and DK096075 awarded by the National Institutes of Health and under grant number W81XWH-09-0001 awarded by the Army. The Government has certain rights in the invention.

TECHNICAL FIELD

The present invention relates generally to organ preservation and organ perfusion systems.

BACKGROUND

Over 30,000 lives in the US are claimed by end-stage liver disease every year. Transplantation is currently the only established treatment, but the critical shortage of donor organs necessitates that more than 60% of wait-listed candidates will not be treated this year. As they become too ill to tolerate the procedure, the majority go on to lose this singular opportunity for recovery.

Alternatives to whole organ transplantation, such as bridge-to-transplantation bioartificial assist devices, cell transplantation and tissue engineered liver substitutes, are all dependent on a reliable, abundant and affordable source of viable human hepatocytes (the major functional cells in the liver). Since all healthy donor organs are used for transplantation, only suboptimal livers remain for cell isolation purposes. The cells from these livers are inadequate and of insufficient quality to meet the continuous needs of cell-based treatments.

The current gold standard of preservation "static cold storage" merely comprises flushing the organs of blood and transporting them on ice. Static cold storage offers no means of providing the organs with the treatments they need or evaluating their viability prior to transplantation. It is a deleterious process that slowly deprives the organ of oxygen and nutrients, and can therefore be tolerated only by the healthiest donor organs for a finite period of time. As a direct consequence thousands of donor livers are disqualified because of largely-reversible pathologies or the lack of objective data regarding their viability. Without a novel methodology to recover their utility, an invaluable resource is being wasted.

SUMMARY

Provided herein are organ perfusion systems that can operate at room temperature. The organ perfusion systems described herein can prevent or decrease ischemic damage in an organ, thus having the potential to preventing thousands of donor organs from being disqualified for transplantation. The organ perfusion systems described herein can also increase the recovery of cells from damaged organs.

The invention is based on, inter alia, the discovery that the organ perfusion systems described herein can be used at room temperature to effectively maintain liver function with minimal injury and sustain or improve various hepatobiliary parameters post ischemia. The organ perfusion systems described herein do not require a temperature controller or any means for controlling the temperature.

In one aspect, the technology described herein relates to an organ perfusion system operating at room temperature, the system comprising (a) a first container configured to encase an organ removed from a subject and store a perfusion fluid, whereby the organ is at least partially immersed in the perfusion fluid; (b) a fluidic circuit system having a first end connected to the perfusion fluid stored in the first container and a second end connected to the organ, the fluidic circuit system configured to draw the perfusion fluid through the first end and perfuse the organ with the perfusion fluid.

In some embodiments, the organ perfusion system does not comprise a cleaning device for cleaning the perfusion fluid. In some embodiments, the cleaning device is a dialyzer, filter, or scrubber.

In some embodiments, the organ perfusion system is portable.

In some embodiments, the fluidic circuit system comprises a pressure sensor configured to measure the pressure of the perfusion fluid flowing towards the organ.

In some embodiments, the fluidic circuit system comprises a pump configured to control the pressure of the perfusion fluid as a function of the measurements of the pressure sensor.

In some embodiments, the fluidic circuit system comprises an oxygenator configured to increase oxygen level in the perfusion fluid flowing towards the organ.

In some embodiments, the fluidic circuit system comprises a bubble-removing device configured to remove bubbles from the perfusion fluid flowing towards the organ.

In some embodiments, the bubble-removing device is a bubble trap or a bubble filter.

In some embodiments, the organ is selected from the group consisting of liver, pancreas, kidney, spleen, heart, lung, and a vascular composite tissue that can be cannulated for perfusion.

In some embodiments, the organ comprises a portal vein and an artery, and the fluidic circuit system comprises (a) a first fluidic circuit connected to the portal vein and configured to flow a first perfusion fluid through the portal vein and (b) a second fluidic circuit connected to the artery and configured to flow a second perfusion fluid through the artery.

In some embodiments, the organ is liver.

In some embodiments, the first fluidic circuit is independently controlled from the second fluidic circuit.

In some embodiments, the first fluidic circuit is not independently controlled from the second fluidic circuit.

In some embodiments, the first fluidic circuit comprises a first pressure sensor configured to measure the pressure of the first perfusion fluid flowing towards the organ.

In some embodiments, the first fluidic circuit comprises a first pump configured to control the pressure of the first perfusion fluid as a function of the measurements of the first pressure sensor.

In some embodiments, the pressure of the first perfusion fluid is in the range of 1-10 mmHg.

In some embodiments, the first fluidic circuit comprises a first oxygenator configured to increase a first oxygen level in the first perfusion fluid flowing towards the organ.

In some embodiments, the first fluidic circuit comprises a first bubble-removing device configured to remove bubbles from the first perfusion fluid flowing towards the organ.

In some embodiments, the second fluidic circuit comprises a second pressure sensor configured to measure the pressure of the second perfusion fluid flowing towards the organ.

In some embodiments, the second fluidic circuit comprises a second pump configured to control the pressure of the second perfusion fluid as a function of the measurements of the second pressure sensor.

In some embodiments, the pressure of the second perfusion fluid is in the range of 20-120 mmHg.

In some embodiments, the second fluidic circuit comprises a second oxygenator configured to increase a second oxygen level in the second perfusion fluid flowing towards the organ.

In some embodiments, the second fluidic circuit comprises a bubble-removing device configured to remove bubbles from the second perfusion fluid flowing towards the organ.

In some embodiments, the oxygenator is coupled to an oxygen container.

In some embodiments, the perfusion fluid is a rich and chemically-defined medium.

In some embodiments, the perfusion fluid comprises Williams' medium E.

In some embodiments, the perfusion fluid further comprises insulin, one or more antibiotics, hydrocortisone, or any combinations thereof.

In some embodiments, the perfusion fluid does not comprise red blood cells.

In some embodiments, the organ perfusion system further comprises a second container connected to the organ and configured to collect a product produced by the organ.

In some embodiments, the product is bile produced by the liver.

In some embodiments, the pump is at least partially immersed in the perfusion fluid stored in the first container.

In some embodiments, the first container is gas permeable.

In some embodiments, the subject is mammalian. In some embodiments, the subject is a human.

In some embodiments, the organ perfusion system further comprises a power supply module for supplying power to the organ perfusion system. In some embodiments, the power supply module is a battery.

Methods are also disclosed herein for preserving an organ, preventing ischemic damage in an organ, or recovering an ischemically damaged organ, the methods comprising connecting the organ to the organ perfusion systems described herein.

BRIEF DESCRIPTION OF THE DRAWINGS

(FIG. 2C) Perfusate sodium, potassium and chloride concentrations during room-temperature machine perfusion. (FIG. 2D) Oxygen uptake rate (OUR) and partial oxygen pressure in the inflow and outflow perfusate. (FIG. 2E) pH of the inflow perfusate. (FIG. 2F) Lactate concentration in the perfusate during room-temperature machine perfusion. Shaded areas represent normal electrolyte ranges in blood. Data presented as median and interquartile range.

DETAILED DESCRIPTION

The invention discloses organ perfusion systems that do not require temperature controllers. The invention is based on, inter alia, the discovery that the organ perfusion systems described herein can be used at room temperature to effectively maintain liver function with minimal injury and sustain or improve various hepatobiliary parameters post ischemia. In some embodiments, the organ perfusion systems described herein do not require cleaning devices for cleaning the perfusion fluid. Non-limiting examples of cleaning devices include dialyzers, filters, and scrubbers. By eliminating temperature controllers and/or cleaning devices in the perfusion systems, these systems can be simplified and miniaturized. In some embodiments, the organ perfusion systems can be portable.

The organ perfusion systems described herein are different from the systems described in WO2011/002926 and WO2011/140241. For example, the perfusion system in WO2011/002926 requires a temperature controller in the form of a heat exchanger. Additionally, the perfusion system in WO2011/002926 requires a dialyzer. The perfusion system in WO2011/140241 also requires a temperature controller as the organ needs to be cooled and stored at a predefined sub-zero temperature.

The organ perfusion systems described herein can be used on a variety of organs including, but not limited to, liver, pancreas, kidney, spleen, heart, and lung. The organ perfusion systems described herein can be used on any vascular composite tissues that can be cannulated for perfusion, including limbs, face, abdominal wall, among others. The systems and methods described herein provide a valuable solution to the problem of organ shortage for transplantation.

Figure 7:
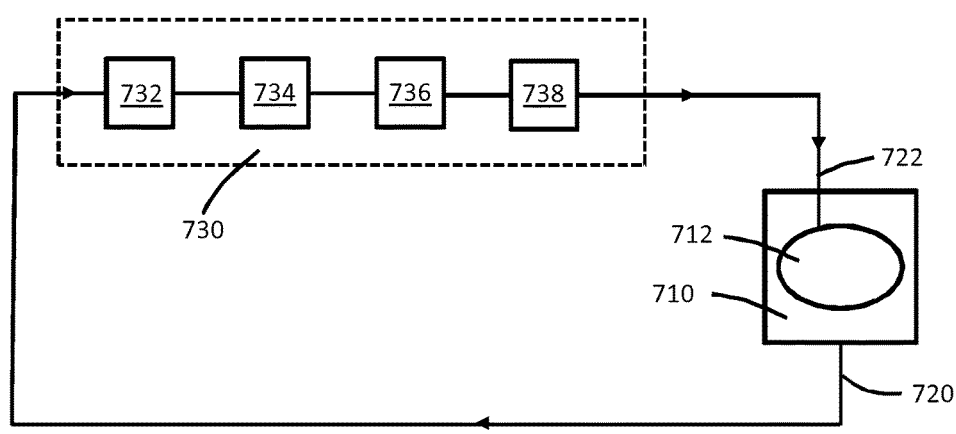
FIG. 7 is an illustration of an organ perfusion system 700 in accordance with some embodiments of the invention.

One aspect of the invention relates to an organ perfusion system as shown in FIG. 7, the perfusion system 700 comprising a container 710 for encasing an organ 712 and storing a perfusion fluid, and a fluidic circuit system 730 connected to the organ 712 for perfusing the organ 712 with the perfusion fluid. The organ 712 can be at least partially immersed in the perfusion fluid. In some embodiments, the organ 712 can be fully immersed in the perfusion fluid. The organ perfusion system 700 does not comprise a temperature controller and/or a dialyzer.

The container 710 can be any container capable of holding the organ 712 and the perfusion fluid. In some embodiments, the container 710 can be a plastic bag. In some embodiments, the container 710 can be a bowl. In some embodiments, the container 710 can comprise polyolefin/polyamide co-extruded plastic (PL-2442).

In some embodiments, the container 710 can be a closed system without exposure to air. The container 710 can function as a bubble trap. Any bubbles will float to the top and can be removed with a syringe or a valve (e.g., luer-lock stopcock).

In some embodiments, the container 710 can have a water-tight zip that opens a flap at the top of the container to allow the organ 712 to be placed in the container 710. The container 710 can be of any shape, depending on how the components fit inside the container 710. For example, the top view of the container 710 can be circular, square, or rectangular. In some embodiments, the container 710 can have a stiff outer ring that determines the shape of the container 710. The height of the outer ring can be determined by the size and/or composition of the tubes that carry the perfusion fluid in the fluidic circuit system 730. In some embodiments, the tubes can be oxygen-permeable, functioning as an oxygenator. In some embodiments, the tubes can be comprised of silicon or the same material as the container 710 is made of.

The fluidic circuit system 730 can have a first end 720 connected to the perfusion fluid stored in the container 710 and a second end 722 connected to the organ 712 through a blood vessel of the organ 712. In some embodiments, the second end 722 is connected to the blood vessel of the organ 712 using valved quick disconnects. The fluidic circuit system 730 can thus draw the perfusion fluid stored in the container 710, flow the perfusion fluid through one or more components, and perfuse the organ 712 with the perfusion fluid. After passing through the organ 712, the perfusion fluid enters the container 710. The fluidic circuit system 730 can comprise one or more components configured to optimize one or more conditions (e.g., pressure, flow rate, oxygen level, or number of bubbles) of the perfusion fluid flowing into the organ 712. In some embodiments, the fluidic circuit system 730 can comprise a pump 732, an oxygenator 734, a pressure sensor 738, and optionally a bubble-removing device 736. It should be noted that some oxygenators have bubble-removing capabilities, so a separate bubble-removing device may not be necessary.

The pump 732 is configured to draw the perfusion fluid from the container 710 and control the pressure and/or flow rate of the perfusion fluid flowing towards the organ 712.

Various types of pump can be used in the perfusion system 700. Preferably, the pump does not contaminate the perfusion fluid. In some embodiments, the pump 732 can be at least partially immersed in the perfusion fluid stored in the container 710. In some embodiments, the pump 732 can be fully immersed in the perfusion fluid stored in the container 710.

The oxygenator 734 is configured to increase the oxygen level in the perfusion fluid flowing towards the organ 712. In some embodiments, the oxygenator 734 can increase the oxygen levels by at least 10%, at least 20%, at least 30%, at least 40%, at least 50%, at least 60%, at least 70%, at least 80%, or at least 90% as compared to the oxygen level in the perfusion fluid when the oxygenator is not used. In some embodiments, the oxygenator 734 can be coupled to an oxygen container containing oxygen. In some embodiments, the oxygen container can contain at least about 70% oxygen by volume, at least about 80% oxygen by volume, at least 90% oxygen by volume, or at least 95% oxygen by volume. For example, the oxygen container can contain about 95% oxygen and 5% carbon dioxide. The oxygen container can be connected to the outer ring, either sitting in a pocket within the ring if it is large enough, or attached outside to the ring. The ring is sealed from top to bottom, but on the opposite end of the oxygenator (across the device) there is a small release hole for the oxygen to escape. In some embodiments, the oxygenator 734 can be at least partially immersed in the perfusion fluid stored in the container 710. In some embodiments, the oxygenator 734 can be fully immersed in the perfusion fluid stored in the container 710.

In some embodiments, the oxygenator 734 can comprise the same microfibers as dialyzers (e.g., Gambro), with the potting compound/glue forming the seat in which the organ 712 sits.

The bubble-removing device 736 is configured to remove one or more bubbles from the perfusion fluid flowing towards the organ 712. As used herein, the term "bubble-removing device" means broadly any air removal technology or device. Examples of bubble-removing devices include, but are not limited to, bubble traps and bubble filters. In some embodiments, the bubble-removing device 736 can be at least partially immersed in the perfusion fluid stored in the container 710. In some embodiments, the bubble-removing device 736 can be fully immersed in the perfusion fluid stored in the container 710.

The pressure sensor 738 is configured to measure the pressure of the perfusion fluid flowing towards the organ 712. The pump 732 can control the pressure of the perfusion fluid as a function of the measurements of the pressure sensor 738. In some embodiments, the pressure sensor 738 can be at least partially immersed in the perfusion fluid stored in the container 710. In some embodiments, the pressure sensor 738 can be fully immersed in the perfusion fluid stored in the container 710.

While FIG. 7 shows that the pump 732, oxygenator 734, bubble-removing device 736, and pressure sensor 738 are outside the container 710, in some embodiments, however, at least one of these components is encased by the container 710.

In some embodiments, a control unit (not depicted) can be coupled to at least one of the pump 732, oxygenator 734, bubble-removing device 736, and pressure sensor 738. The control unit can monitor operating parameters (e.g., pressure, flow rate, oxygen levels, electrolyte levels, and the like) and/or organ function and viability indicators (e.g., production of albumin, bile, urea, nitrogen oxide, and the like) via one or more sample ports (not depicted). The sample ports can permit a catheter or syringe to retrieve a sample for measurements. For example, the control unit can control the operation of the pump 732. The control unit can also receive input from, e.g., the one or more pressure sensors. The control unit can include a user interface for displaying one or more parameters and indicators and/or allowing a user to alter one or more parameters.

Additionally or alternatively, the control unit can include storage means for storing one or more parameters and indicators and/or communication means for communicating one or more parameters and indicators with another system (e.g., a personal computer, a cellular phone, a personal digital assistant, and the like). In some embodiments, the control unit includes an audible and/or visual alarm to alert users when one or more parameters or indicators exceeds a threshold.

In some embodiments, the perfusion system 700 can further comprise a container (not shown) connected to the organ 712 to collect a product produced by the organ 712. The product can be a waste product or a metabolic product. For example, liver produces bile, and kidney produces urine. In some embodiments, the container for collecting the product can be a vacutainer tube.

While FIG. 7 shows that the pump, oxygenator, bubble-removing device, and pressure sensor are connected in a specific order in the fluid pathway, variations of this order are contemplated as long as the functions of these components can be properly executed for their intended purposes. For example, the pressure sensor can be placed before the bubble-removing device in the fluid pathway.

Figure 8:
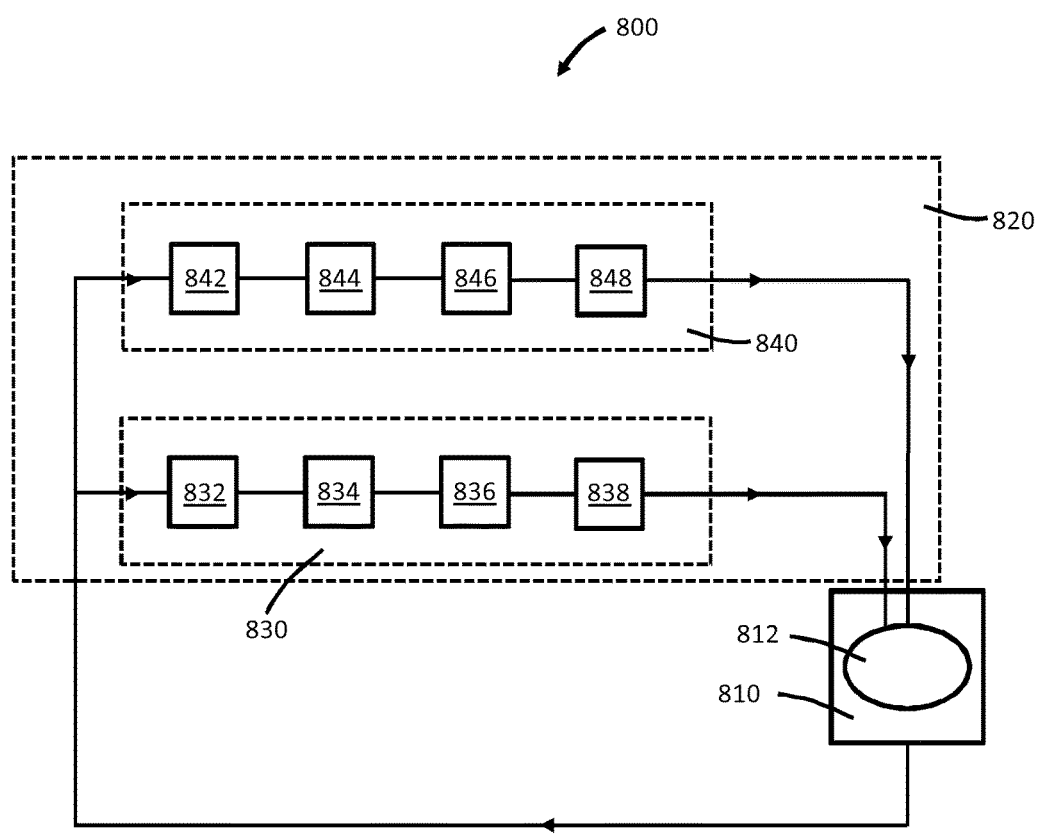
FIG. 8 is an illustration of an organ perfusion system 800 in accordance with some embodiments of the invention.

Some organs may comprise at least two types of blood vessel. For example, some organs such as liver comprise a portal vein and an artery. In some embodiments, a fluidic circuit system can comprise two or more fluidic circuits, each of which can be connected to each type of blood vessel. FIG. 8 is an illustration of an organ perfusion system 800 in accordance with some embodiments of the invention, wherein the organ comprises at least two types of blood vessel. The system 800 can comprise a first container 810 configured to encase an organ 812 and store a perfusion fluid, a fluidic circuit system 820 connected to the organ 812 and configured to perfuse the perfusion fluid through the organ 812.

In some embodiments, the at least two types of blood vessel are portal vein and artery. The fluidic circuit system 820 can comprise a first fluidic circuit 830 connected to the portal vein of the organ 812 and configured to flow a first perfusion fluid through the portal vein, and a second fluidic circuit 840 connected to the artery of the organ 812 and configured to flow a second perfusion fluid through the artery. In some embodiments, the first perfusion fluid and the second perfusion fluid are both drawn from the perfusion fluid stored in the first container 810.

The first fluidic circuit 830 and second fluidic circuit 840 can share a common fluidic pathway. In some embodiments, the fluidic circuit system 820 uses a single pump to draw the perfusion fluid from the first container 812, and the perfusion fluid is then split into the first fluidic circuit 830 and second fluidic circuit 840. In some embodiments, the first fluidic circuit 830 and second fluidic circuit 840 can share one oxygenator, one bubble-removing device, and/or a pressure sensor.

In some embodiments, the first fluidic circuit 830 is independently controlled from the second fluidic circuit 840. In some of these embodiments, the first fluidic circuit 830 can comprise a first pump 832 and the second fluidic circuit 840 can comprise a second pump 842. The first pump 832 and second pump 842 can each independently control the pressure and/or flow rate of the perfusion fluid in the circuits. The first fluidic circuit 830 can also comprise a first oxygenator 834, a first pressure sensor 838, and optionally a first bubble-removing device 836 that are fluidicly coupled with each other. Similarly, the second fluidic circuit 840 can also comprise a second oxygenator 844, a second pressure sensor 848, and optionally a second bubble-removing device 846, and that are fluidicly coupled with each other. It should be noted that in the embodiments of the first fluidic circuit 830 independently controlled from the second fluidic circuit 840, the two fluidic circuits can each have its own control unit or share one control unit.

The pumps 832 and 842 are configured to draw the perfusion fluid from the first container 810 and control the pressure and/or flow rate of the perfusion fluid flowing towards the organ 812.

In some embodiments, the pump 832 controls the pressure of the first perfusion fluid flowing towards to the organ 812 to be in the range of 1-20 mmHg. In some embodiments, the pump 832 controls the pressure of the first perfusion fluid flowing towards to the organ 812 to be in the range of 1-15 mmHg. In some embodiments, the pump 832 controls the pressure of the first perfusion fluid flowing towards to the organ 812 to be in the range of 1-10 mmHg. In some embodiments, the pump 832 controls the pressure of the first perfusion fluid flowing towards to the organ 812 to be in the range of 4-7 mmHg.

In some embodiments, the pump 832 controls the flow rate of the first perfusion fluid flowing towards to the organ 812 to be in the range of 200-1500 mL/min. In some embodiments, the pump 832 controls the flow rate of the first perfusion fluid flowing towards to the organ 812 to be in the range of 200-1200 mL/min. In some embodiments, the pump 832 controls the flow rate of the first perfusion fluid flowing towards to the organ 812 to be in the range of 200-1000 mL/min. In some embodiments, the pump 832 controls the flow rate of the first perfusion fluid flowing towards to the organ 812 to be in the range of 200-800 mL/min.

In some embodiments, the pump 842 controls the pressure of the second perfusion fluid flowing towards to the organ 812 to be in the range of 10-150 mmHg. In some embodiments, the pump 842 controls the pressure of the second perfusion fluid flowing towards to the organ 812 to be in the range of 20-150 mmHg. In some embodiments, the pump 842 controls the pressure of the second perfusion fluid flowing towards to the organ 812 to be in the range of 20-120 mmHg. In some embodiments, the pump 842 controls the pressure of the second perfusion fluid flowing towards to the organ 812 to be in the range of 50-120 mmHg. In some embodiments, the pump 842 controls the pressure of the second perfusion fluid flowing towards to the organ 812 to be in the range of 50-80 mmHg.

In some embodiments, the pump 832 controls the flow rate of the second perfusion fluid flowing towards to the organ 812 to be in the range of 50-500 mL/min. In some embodiments, the pump 832 controls the flow rate of the second perfusion fluid flowing towards to the organ 812 to be in the range of 50-400 mL/min. In some embodiments, the pump 832 controls the flow rate of the second perfusion fluid flowing towards to the organ 812 to be in the range of 50-300 mL/min. In some embodiments, the pump 832 controls the flow rate of the second perfusion fluid flowing towards to the organ 812 to be in the range of 50-200 mL/min.

In some embodiments of the organ perfusion systems described herein, the perfusion system can further comprise a power supply module. In some embodiments, the power supply module is a battery.

Figure 9:
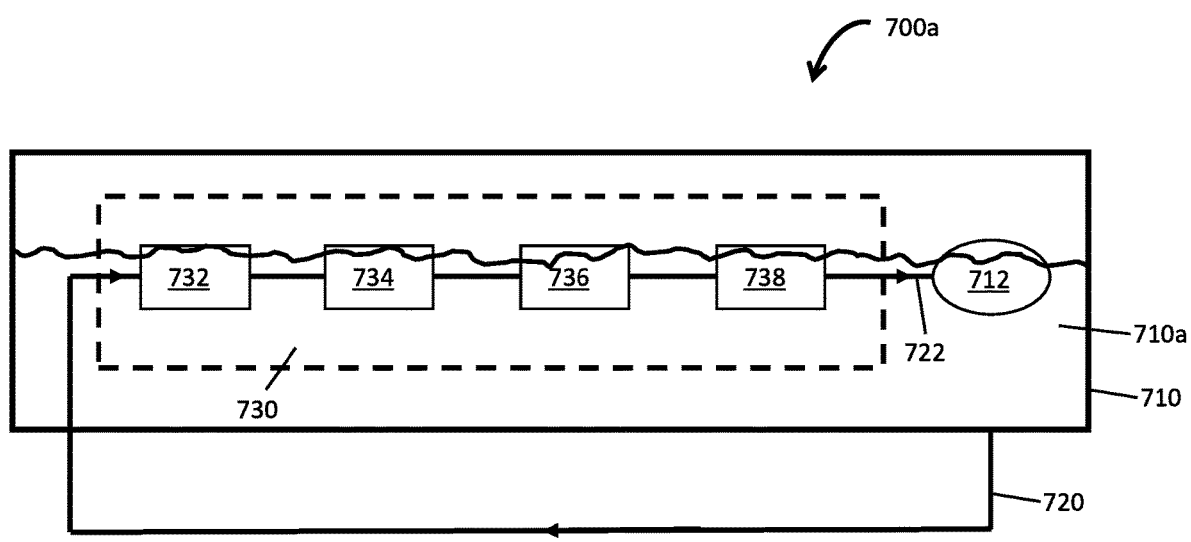
FIG. 9 is an illustration of an organ perfusion system 700a in accordance with some embodiments of the invention.

One aspect of the invention relates to an organ perfusion system as shown in FIG. 9, the perfusion system 700a comprising a container 710 for encasing an organ 712 and storing a perfusion fluid 710a, and a fluidic circuit system 730 connected to the organ 712 for perfusing the organ 712 with the perfusion fluid 710a. In some embodiments, the organ 712 can be at least partially immersed in the perfusion fluid 710a. In some embodiments, the fluidic circuit system 730 can comprise a pump 732, an oxygenator 734, a pressure sensor 738, and optionally a bubble-removing device 736. In some embodiments, the pump 732 can be at least partially immersed in the perfusion fluid 710a stored in the container 710. In some embodiments, the oxygenator 734 can be at least partially immersed in the perfusion fluid 710a stored in the container 710. In some embodiments, the bubble-removing device 736 can be at least partially immersed in the perfusion fluid 710a stored in the container 710. In some embodiments, the pressure sensor 738 can be at least partially immersed in the perfusion fluid 710a stored in the container 710. The organ perfusion system 700a does not comprise a temperature controller and/or a dialyzer.

In some embodiments of the organ perfusion systems described herein, the container for encasing the organ is gas permeable. In some of these embodiments, the oxygenator is not connected to the fluidic circuit, but rather the container for encasing the organ resides in a box that gets oxygenated.

In some embodiments, the perfusion fluid which can be used in the systems and methods as disclosed herein is a rich and chemically-defined medium. As used herein, the term "rich", when used to describe a medium, refers to a medium containing nutrients, amino acids, vitamins, antioxidants and the like. As used herein, the term "chemically-defined medium" means that all of the chemical components in the medium are known.

In some embodiments, the perfusion fluid comprises a base solution which is Williams' Medium E solution (available from Sigma-Aldrich Corp. of St. Louis, Mo.). In some embodiments, the perfusion fluid does not comprise erythrocytes. In some embodiments, the perfusion fluid can comprise one or more antioxidants such as bucillamine. See Farin Amersi, et al, "Bucillamine, a thiol antioxidant, prevents transplantation-associate reperfusion injury," 99(13) Proc. Nat'l Acad. Sci. 8915-20 (2002). In some embodiments, the perfusion fluid can comprise one or more anti-inflammatory agents such as hydrocortisone. In some embodiments, the perfusion fluid can comprise one or more vasodilators such as alpha-adrenoceptor antagonists ("alpha-blockers"), endothelin receptor antagonists ("ERAs"), angiotensin converting enzyme inhibitors ("ACE inhibitors"), and the like. In some embodiments, the perfusion fluid can comprise one or more amino acids such as L-argenine, L-glutamine, and the like. In some embodiments, the perfusion fluid can comprise one or more buffers such as phosphate buffered saline ("PBS"), Krebs-Ringer buffer ("KRB") (available from Sigma Aldrich, Inc. of St. Louis, Mo.), and the like. In some embodiments, the perfusion fluid can comprise one or more inorganic salts such as sodium chloride, calcium chloride, potassium chloride, and the like. In some embodiments, the perfusion fluid can comprise one or more substrates for metabolism such as glucose and other carbohydrates, lactate, fatty acids, other energy sources, vitamins, and the like. In some embodiments, the perfusion fluid can comprise one or more hormones such as insulin. In some embodiments, the perfusion fluid can comprise one or more antibiotics such as penicillin and/or streptomycin. In some embodiments, the perfusion fluid can comprise plasma. The one or more anticoagulants can include heparin. In some embodiments, the perfusion fluid can comprise one or more agents for maintaining oncotic pressure such as albumin, polyethylene glycol, and the like.

In some embodiments, the perfusion fluid can comprise varying levels of insulin, e.g., about 1 µg/L, or about 2 µg/L, or about 3 µg/L, or about 4 µg/L, or about 5 µg/L, or more than about 5 µg/L.

In some embodiments, the perfusion fluid can comprise varying levels of glucagon, for example, in the range of about 0-20 ng/L, or about 10-30 ng/L or about 20-50 ng/L, for example, about 5 ng/L, or about 10 ng/L, or about 15 ng/L, or about 20 ng/L, or about 50 ng/L or more than about 50 ng/L of glucagon.

In some embodiments, the perfusion fluid comprises one or more of the following: Williams Medium E (#W1878, Sigma), 5 U/L insulin (Humulin, Eli Lily, Indianapolis, Ind.), 40,000 U/L penicillin, 40 mg/L streptomycin sulfate (Gibco, Invitrogen, Grandlsland, N.Y.), 10 mg/L hydrocortisone (Solu-Cortef, Pharmacia & Upjohn, Kalamazoo, Mich.).

In some embodiments, the perfusion fluid can include a solution of osmolality ranging from about 100 mOsm to about 500 mOsm, one or more antioxidants, one or more anti-inflammatory agents, one or more vasodilators, one or more amino acids, one or more buffers, one or more inorganic salts, one or more substrates for metabolism, and one or more agents to maintain oncotic pressure between about 15 to about 45 mm Hg.

In some embodiments, the perfusion fluid can comprise decellularization agents, for example, one or more agents selected from the group consisting of detergents, vasodilators, buffers, inorganic salts, and enzymes. Non-limiting examples of inorganic salts include calcium chloride, cupric sulfate, ferric nitrate, magnesium chloride, magnesium sulfate, potassium chloride, sodium bicarbonate, sodium chloride, sodium chloride, and zinc sulfate.

The organ perfusion systems described herein can be used in a variety of applications including, but not limited to, organ preservation, prevention of an organ from ischemic damage, recovery of an ischemically damaged organ, organ rehabilitation, and recovery of cells from damaged organs. In some embodiments, the organ perfusion systems described herein can be used to perfuse decellularized scaffolds on which one or more cells are engrafted. In some embodiments, cell isolation can be performed after an organ is perfused with the systems described herein.

In some embodiments, the organ can be donated by a donor subject and transplanted into a recipient subject. In some embodiments, the organ can be isolated from a subject for rehabilitation using the systems described herein. The organ is then transplanted back to the same subject once it is determined to be functional. In some embodiments, the subject is a mammal. In some embodiments, the subject is a human.

In some embodiments, the organ can be stored below room temperature prior to perfusion. Prior to connecting the organ to the organ perfusion systems described herein, the organ can be flushed with a solution such as a NaCl solution. For example, the donor liver can be flushed with 2 L of cold 0.9% NaCl solution through the portal vein and 1 L through the artery.

In some embodiments, an organ can be perfused from about several hours to about 14 days. In some embodiments, an organ can be perfused for between about 4 days and about 7 days. In some embodiments, an organ can be perfused for at least 1 hour, or at least about 2, or 3, or 4, or 5, or 6, or 7, or 8, or 9, or 10 or 11, or 12 hours, or about 24 or about 36 hours, or about 48 hours, or about 3 days or more than 3 days.

The viability or transplant-worthiness of the organ can be assessed using methods known in the art, e.g., see WO 2011/140241, the contents of which are incorporated herein by reference in their entirety.

In some embodiments, the method of organ perfusion with a perfusion fluid as disclosed herein permits one to maintain or extend the viability and storage time of cells, tissues, and organs beyond current limits. In some embodiments, the method of perfusing an organ or tissue with a perfusion fluid as disclosed herein is at least about 20% reliable, or about 30% reliable, or about 40% reliable, or about 50% reliable, or about 60% reliable, or about 70% reliable, or about 80% reliable, or about 90% reliable, or about 100% reliable, in that, after perfusing a perfusion fluid (with or without subsequent steps of metabolic suppression via chemical or environmental means) the organ reaches the required threshold of viability for transplantability, or a reaches the required threshold of viability for cell viability for cell harvesting.

In some embodiments, the method of perfusing an organ or tissue with a perfusion fluid as disclosed herein prevents ischemic damage in the organ by about 10%, or by about 20%, or by about 30%, or by about 40%, or by about 50%, or by about 60%, or by about 70%, or by about 80%, or by about 90%, or by about 100% as compared to an organ, or tissue which has not been perfused with the perfusion fluid as disclosed herein.

In another embodiment, the amount of ischemic damage to an organ or tissue is decreased upon perfusion with the perfusion fluid according to the methods as disclosed herein by about at least 10%, or at least about 20%, or at least about 30%, or at least about 40%, or at least about 50%, or at least about 60%, or at least about 70%, or at least about 80%, or at least about 90%, greater than 90% as compared to an organ which has not undergone perfusion with the perfusion fluid as disclosed herein. Stated another way, in some embodiments, an organ or tissue which has undergone perfusion with the perfusion fluid according to the methods as disclosed herein has at least about 10% more viable cells than an organ or tissue which has not undergone the perfusion with the perfusion fluid, or about 20% more viable cells, or about 30% more viable cells, or about 40% more viable cells, or about 50% more viable cells, or about 60% more viable cells, or about 70% more viable cells, or about 80% more viable cells, or about 90% more viable cells, or about 100% more viable cells, or about 200% more viable cells, or about 1000% more viable cells, or more than 1000% more viable cells as compared to an organ or tissue which has not undergone the perfusion with the perfusion fluid as disclosed herein.

It should be understood that this invention is not limited to the particular methodology, protocols, and reagents, etc., disclosed herein and as such may vary. The terminology used herein is for the purpose of describing particular embodiments only, and is not intended to limit the scope of the present invention, which is defined solely by the claims.

As used herein and in the claims, the singular forms include the plural reference and vice versa unless the context clearly indicates otherwise. Other than in the operating examples, or where otherwise indicated, all numbers expressing quantities of ingredients or reaction conditions used herein should be understood as modified in all instances by the term "about."

Although any known methods, devices, and materials may be used in the practice or testing of the invention, the methods, devices, and materials in this regard are disclosed herein.

Some embodiments of the invention are listed in the following numbered paragraphs:

1. An organ perfusion system operating at room temperature, the system comprising a first container configured to encase an organ removed from a subject and store a perfusion fluid, whereby the organ is at least partially immersed in the perfusion fluid; a fluidic circuit system having a first end connected to the perfusion fluid stored in the first container and a second end connected to the organ, the fluidic circuit system configured to draw the perfusion fluid through the first end and perfuse the organ with the perfusion fluid, and wherein the organ perfusion system does not comprise a temperature controller.

2. The organ perfusion system of paragraph 1, wherein the organ perfusion system does not comprise a cleaning device for cleaning the perfusion fluid.

3. The organ perfusion system of paragraph 2, wherein the cleaning device is a dialyzer, filter, or scrubber.

4. The organ perfusion system of any one of paragraphs 1-3, wherein the organ perfusion system is portable.

5. The organ perfusion system of any one of paragraphs 1-4, wherein the fluidic circuit system comprises a pressure sensor configured to measure the pressure of the perfusion fluid flowing towards the organ.

6. The organ perfusion system of any one of paragraphs 1-5, wherein the fluidic circuit system comprises a pump configured to control the pressure of the perfusion fluid as a function of the measurements of the pressure sensor.

7. The organ perfusion system of any one of paragraphs 1-6, wherein the fluidic circuit system comprises an oxygenator configured to increase oxygen level in the perfusion fluid flowing towards the organ.

8. The organ perfusion system of any one of paragraphs 1-7, wherein the fluidic circuit system comprises a bubble-removing device configured to remove bubbles from the perfusion fluid flowing towards the organ.

9. The organ perfusion system of paragraph 8, wherein the bubble-removing device is a bubble trap or a bubble filter.

10. The organ perfusion system of any one of paragraphs 1-9, wherein the organ is selected from the group consisting of liver, pancreas, kidney, spleen, heart, lung, and a vascular composite tissue that can be cannulated for perfusion.

11. The organ perfusion system of any one of paragraphs 1-9, wherein the organ comprises a portal vein and an artery, and wherein the fluidic circuit system comprises (a) a first fluidic circuit connected to the portal vein and configured to flow a first perfusion fluid through the portal vein and (b) a second fluidic circuit connected to the artery and configured to flow a second perfusion fluid through the artery.

12. The organ perfusion system of paragraph 11, wherein the organ is liver.

13. The organ perfusion system of paragraph 11 or 12, wherein the first fluidic circuit is independently controlled from the second fluidic circuit.

14. The organ perfusion system of paragraph 11 or 12, wherein the first fluidic circuit is not independently controlled from the second fluidic circuit.

15. The organ perfusion system of any one of paragraphs 11-14, wherein the first fluidic circuit comprises a first pressure sensor configured to measure the pressure of the first perfusion fluid flowing towards the organ.

16. The organ perfusion system of paragraph 15, wherein the first fluidic circuit comprises a first pump configured to control the pressure of the first perfusion fluid as a function of the measurements of the first pressure sensor.

17. The organ perfusion system of paragraph 16, wherein the pressure of the first perfusion fluid is in the range of 1-10 mmHg.

18. The organ perfusion system of any one of paragraphs 11-17, wherein the first fluidic circuit comprises a first oxygenator configured to increase a first oxygen level in the first perfusion fluid flowing towards the organ.

19. The organ perfusion system of any one of paragraphs 11-18, wherein the first fluidic circuit comprises a first bubble-removing device configured to remove bubbles from the first perfusion fluid flowing towards the organ.

20. The organ perfusion system of any one of paragraphs 11-19, wherein the second fluidic circuit comprises a second pressure sensor configured to measure the pressure of the second perfusion fluid flowing towards the organ.

21. The organ perfusion system of paragraph 20, wherein the second fluidic circuit comprises a second pump configured to control the pressure of the second perfusion fluid as a function of the measurements of the second pressure sensor.

22. The organ perfusion system of paragraph 21, wherein the pressure of the second perfusion fluid is in the range of 20-120 mmHg.

23. The organ perfusion system of any one of paragraphs 11-22, wherein the second fluidic circuit comprises a second oxygenator configured to increase a second oxygen level in the second perfusion fluid flowing towards the organ.

24. The organ perfusion system of any one of paragraphs 11-23, wherein the second fluidic circuit comprises a bubble-removing device configured to remove bubbles from the second perfusion fluid flowing towards the organ.

25. The organ perfusion system of paragraph 7, 18, or 23, wherein the oxygenator is coupled to an oxygen container.

26. The organ perfusion system of any one of paragraphs 1-25, wherein the perfusion fluid is a rich and defined medium.

27. The organ perfusion system of paragraph 26, wherein the perfusion fluid comprises Williams' medium E.

28. The organ perfusion system of paragraph 27, wherein the perfusion fluid further comprises insulin, one or more antibiotics, hydrocortisone, or any combinations thereof.

29. The organ perfusion system of any one of paragraphs 1-28, wherein the perfusion fluid does not comprise red blood cells.

30. The organ perfusion system of any one of paragraphs 1-29, further comprising a second container connected to the organ and configured to collect a product produced by the organ.

31. The organ perfusion system of paragraph 30, wherein the product is bile produced by the liver.

32. The organ perfusion system of paragraph 6, wherein the pump is at least partially immersed in the perfusion fluid stored in the first container.

33. The organ perfusion system of any one of paragraphs 1-32, wherein the first container is gas permeable.

34. The organ perfusion system of any one of paragraphs 1-33, wherein the subject is mammalian.

35. The organ perfusion system of paragraph 34, wherein the subject is human.

36. The organ perfusion system of any one of paragraphs 1-35, further comprising a power supply module for supplying power to the organ perfusion system.

37. The organ perfusion system of paragraph 36, wherein the power supply module is a battery.

38. A method of preserving an organ, the method comprising connecting the organ to an organ perfusion system of any one of paragraphs 1-37 to perfuse the organ.

39. A method of preventing ischemic damage in an organ, the method comprising connecting the organ to an organ perfusion system of any one of paragraphs 1-37 to perfuse the organ.

40. A method of recovering an ischemically damaged organ, the method comprising connecting the organ to an organ perfusion system of any one of paragraphs 1-37 to perfuse the organ.

Definitions

Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. The definitions are provided to aid in describing particular embodiments, and are not intended to limit the claimed invention, because the scope of the invention is limited only by the claims. Further, unless otherwise required by context, singular terms shall include pluralities and plural terms shall include the singular.

As used herein the term "comprising" or "comprises" is used in reference to compositions, methods, and respective component(s) thereof, that are useful to an embodiment, yet open to the inclusion of unspecified elements, whether useful or not.

As used herein the term "consisting essentially of" refers to those elements required for a given embodiment. The term permits the presence of elements that do not materially affect the basic and novel or functional characteristic(s) of that embodiment of the invention.

As used herein, the term "portable" refers to a device that can be held by a person of ordinary strength in one or two hands, without the need for any special carriers. A portable device can be configured to be used outside of a laboratory setting. In certain embodiments, a portable device is, e.g., battery powered.

The term "organ" as used herein refers to a structure of bodily tissue in a subject, e.g., a mammalian subject such as a human, wherein the tissue structure as a whole is specialized to perform a particular bodily function. Organs which are perfused within the meaning of the present invention include for example, but without limitation, heart, lung, kidney, pancreas, liver, spleen. In some embodiments, the term "organ" also encompasses decellularized and recellularized organs, as well as engineered and artificial organs and tissues, including engineered organs (e.g., tissue engineered constructs), engineered organs comprising a bioscaffold, tissues, organ slices and partial organs. In some embodiments, the organ can be a vascular composite tissue that can be cannulated for perfusion, including limbs, face, abdominal wall, among others.

The term "viability" as used herein refers to the state of an organ's survival capability, e.g., capable of survival after transplantation into a recipient. Viability can be used as a measure of the entire organ's survival or a part of the organ, or the viability of cells within the organ.

The term "reliability" as used herein refers to the extent to which a measure, procedure or instrument yields the same result on repeated trials. Stated another way, reliability as used herein refers how well a particular assessment method provides consistent results, regardless of who uses the method or when it is used.

The term "marginal organ" or "damaged organ" as used herein shall be understood to indicate an organ that is in less than ideal condition for transplantation, such that the expected probability of transplant success is reduced. Examples of damaged organs include, but are not limited to, organs that suffer warm ischemia for more than 30 minutes, organs that suffer cold ischemia for more than 12 hours, moderate or highly steatotic livers (e.g., livers with greater than 30% fat), fibrotic livers, cirrhotic livers, livers from patients afflicted with hepatitis C or HIV, and the like.

The term "transplantation" refers to the method of transferring of an organ, or other bodily tissue from its site of origin in one subject to a recipient site in the same or a different subject, whether or not autologous, homologous or heterologous and whether or not it is performed directly or subsequently to further processing or preservation of the tissue or organ.

The term "room temperature" as used herein shall be understood to mean a temperature between about 15° C. and about 25° C. For example, "room temperature" includes, but is not limited to, temperatures between about 18° C. and about 23° C., temperature between about 19° C. and about 21° C., temperatures between about 24° C. and about 25° C., temperatures between about 20° C. and about 21° C., and the like.

The term "perfusion" as used herein refers to the flowing of fluid through the tissue or organ. Stated in anther way, perfusion or to "perfuse" refers to supplying an organ, tissue with a fluid by circulating it through blood vessels or other natural channels.

The term "perfusate" or "perfusion fluid" as used herein shall be understood to be any fluid capable of improving or maintaining the vitality of a cell, tissue, organ (including decellularized and recellularized organs), bioscaffold, and the like. Improving or maintaining vitality can include one or more of the following: maintenance of appropriate osmotic pressure, maintenance of appropriate oncotic pressure, maintenance of appropriate temperature, inhibition of decay, inhibition of microbial growth, and the like.

The terms "increased", "increase", "enhance" or "improve" are all used herein to generally mean an increase by a statically significant amount; for the avoidance of any doubt, the terms "increased", "increase", "enhance" or "improve" means an increase of at least 10% as compared to a reference level, for example an increase of at least about 20%, or at least about 30%, or at least about 40%, or at least about 50%, or at least about 60%, or at least about 70%, or at least about 80%, or at least about 90% or up to and including a 100% increase or any increase between 10-100% as compared to a reference level, or at least about a 2-fold, or at least about a 3-fold, or at least about a 4-fold, or at least about a 5-fold or at least about a 10-fold increase, or any increase between 2-fold and 10-fold or greater as compared to a reference level.

The terms "lower", "reduce", "reduction" or "decrease" are all used herein generally to mean a decrease by a statistically significant amount. However, for avoidance of doubt, "lower", "reduce", "reduction" or "decrease" means a decrease by at least 10% as compared to a reference level, for example a decrease by at least about 20%, or at least about 30%, or at least about 40%, or at least about 50%, or at least about 60%, or at least about 70%, or at least about 80%, or at least about 90% or up to and including a 100% decrease (i.e. absent level as compared to a reference sample), or any decrease between 10-100% as compared to a reference level.

The term "statistically significant" or "significantly" refers to statistical significance and generally means a two standard deviation (2SD) or more.

A "subject" shall be understood to include any animal including, but not limited to, humans, primates, swine, cows, sheep, and rats.

The singular terms "a," "an," and "the" include plural referents unless context clearly indicates otherwise. Similarly, the word "or" is intended to include "and" unless the context clearly indicates otherwise.

Other than in the operating examples, or where otherwise indicated, all numbers expressing quantities of ingredients or reaction conditions used herein should be understood as modified in all instances by the term "about." The term "about" when used in connection with percentages may mean±1% of the value being referred to. For example, about 100 means from 99 to 101.

Although methods and materials similar or equivalent to those disclosed herein can be used in the practice or testing of this disclosure, suitable methods and materials are described below. The term "comprises" means "includes." The abbreviation, "e.g." is derived from the Latin exempli gratia, and is used herein to indicate a non-limiting example. Thus, the abbreviation "e.g." is synonymous with the term "for example."

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow. Further, to the extent not already indicated, it will be understood by those of ordinary skill in the art that any one of the various embodiments herein described and illustrated can be further modified to incorporate features shown in any of the other embodiments disclosed herein.

All patents and other publications; including literature references, issued patents, published patent applications, and co-pending patent applications; cited throughout this application are expressly incorporated herein by reference for the purpose of describing and disclosing, for example, the methodologies described in such publications that might be used in connection with the technology disclosed herein. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

The description of embodiments of the disclosure is not intended to be exhaustive or to limit the disclosure to the precise form disclosed. While specific embodiments of, and examples for, the disclosure are disclosed herein for illustrative purposes, various equivalent modifications are possible within the scope of the disclosure, as those skilled in the relevant art will recognize. For example, while method steps or functions are presented in a given order, alternative embodiments may perform functions in a different order, or functions may be performed substantially concurrently. The teachings of the disclosure provided herein can be applied to other procedures or methods as appropriate. The various embodiments disclosed herein can be combined to provide further embodiments. Aspects of the disclosure can be modified, if necessary, to employ the compositions, functions and concepts of the above references and application to provide yet further embodiments of the disclosure.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

EXAMPLES

The following examples illustrate some embodiments and aspects of the invention. It will be apparent to those skilled in the relevant art that various modifications, additions, substitutions, and the like can be performed without altering the spirit or scope of the invention, and such modifications and variations are encompassed within the scope of the invention as defined in the claims which follow. The technology disclosed herein is further illustrated by the following examples which in no way should be construed as being further limiting.

Example 1: Room-Temperature Machine Perfusion for Ex Vivo Preservation and Recovery of the Human Liver for Transplantation To determine the feasibility in human livers, the effect of 3 hours of oxygenated room-temperature machine perfusion (21° C.) on seven livers discarded for transplantation was assessed. Biochemical and microscopic assessment revealed minimal injury sustained during perfusion. Improved oxygen uptake (1.30 [1.11-1.94] to 6.74 [4.15-8.16] mL $O_2$/min kg liver), lactate levels (4.04 [3.70-5.99] to 2.29 [1.20-3.43] mmol/L) and adenosine triphosphate content (45.0 [70.6-87.5] pmol/mg preperfusion to 167.5 [151.5-237.2] pmol/mg after perfusion) were observed. Liver function, reflected by urea, albumin and bile production, was seen during perfusion. Bile production increased and the composition of bile (bile salts/phospholipid ratio, pH and bicarbonate concentration) became more favorable. In conclusion, ex vivo room-temperature machine perfusion effectively maintains liver function with minimal injury and sustains or improves various hepatobiliary parameters post ischemia.

Preserving the viability of the donor liver is essential for successful transplantation. While advances in preservation solutions and immunosuppression have resulted in excellent outcomes following liver transplantation using standard criteria donors [1], transplantation using marginal grafts remains problematic [2, 3]. Donation after circulatory death (DCD) livers with increased warm ischemic time (WIT), in particular, present a challenge as the incidence of primary nonfunction and biliary complications are increased [4]. The increasing use of marginal livers to expand the donor pool demands more sophisticated preservation modalities to prevent or treat the underlying deficiency of these livers.

While conventional static cold storage merely slows the deterioration of the donor liver, ex vivo machine perfusion techniques may be useful in sustaining organ viability, improving it or preconditioning the liver for reperfusion. Preclinical studies using hypothermic machine perfusion (HMP) at 0-4° C. have shown impressive benefits for preservation [5-8]. The first clinical series from 2010 employing HMP in livers donated after brain death (DBD) showed promising initial results and was a large step forward in bringing perfusion techniques to clinical transplantation [9], and a more recent trial showed that HMP of DCD livers produced similar results to unperfused DBD livers [10]. In contrast, normothermic machine perfusion (NMP) at ±37° C. offers the environment for a fully functional metabolism, which supports the reestablishment of homeostasis and other recovery processes, including an increase in adenosine triphosphate (ATP) content [11]. Additionally, maintaining a metabolically functional organ opens the opportunity of viability testing to assess liver function during perfusion and improve donor liver selection and allocation [12, 13]. Recently, the feasibility of NMP has been shown in sustaining discarded human DCD livers [14].

Materials and Methods

Procurement and Back-Table Preparation

Donor livers were obtained from the New England Organ Bank (NEOB) with consent for research from the family after being turned down for clinical transplantation. Extubation of donors after circulatory death was performed by the primary service, which was also responsible for declaration of death 5 min after circulatory cessation. The procurement procedure did not begin until after declaration of death. Standard procurement technique includes an in situ flush with University of Wisconsin (UW) solution, intra-abdominal cooling with ice and an additional back-table UW flush. The gallbladder was incised, aspirated of bile and irrigated with saline. The common bile duct was flushed with UW solution. The relative WIT for DCD livers is defined as the time between extubation and in situ cold flushing, whereas absolute WIT begins after circulatory cessation and ends at in situ cold flushing. Donor livers were transported in sterile bags cooled on ice. On arrival at the center and during the priming of the machine perfusion system the donor liver was prepared for connection to the system. The portal vein and hepatic branches of the celiac trunk and/or superior mesenteric artery were dissected free. The portal vein was cannulated distally with a section of tubing (Masterflex 24 L/S; Cole Palmer, Vernon Hills, Ill.). The aortic segment was opened and the celiac trunk was cannulated at the origin with a vessel cannula (Medtronic, Minneapolis, Minn.). Other branches of the celiac trunk were tied using 0 silk sutures. The cystic duct was ligated and the gallbladder flushed of residual bile. The common bile duct was cannulated with a vessel cannula, which was then connected to a section of tubing to allow bile collection. All cannulae were secured using 0 silk sutures.

Ex Vivo Room-Temperature Machine Perfusion

Figure 1A:
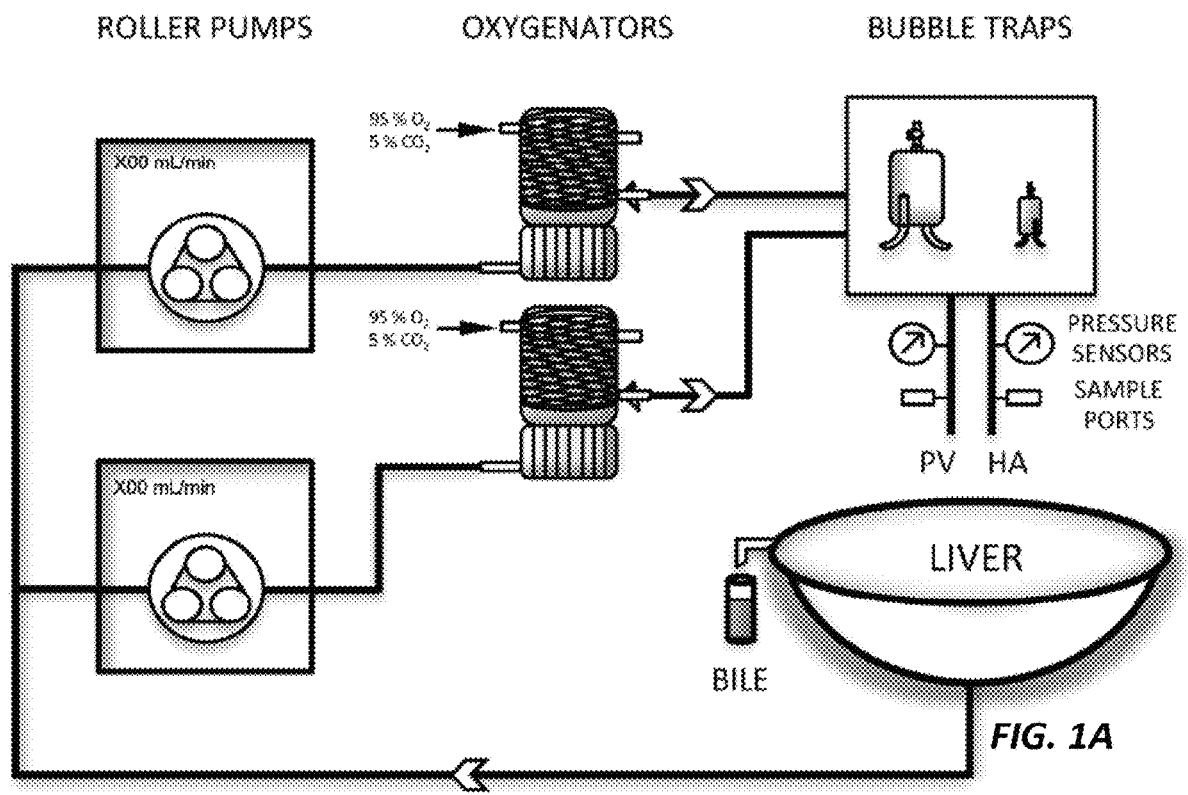
FIGS. 1A-1B show machine perfusion system operating at room temperature. Schematic representation (FIG. 1A) and actual photo (FIG. 1B) of a liver in the system.
Figure 1B:
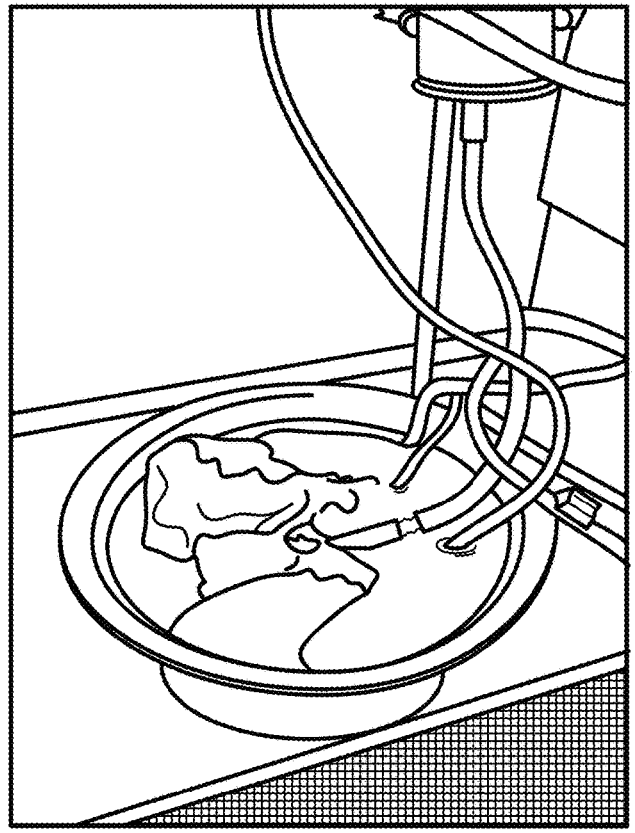

The room-temperature perfusion system consisted of two independent circulations for portal and arterial perfusion, each including a roller pump (Masterflex L/S; Cole Palmer), hollow-fiber oxygenator (Affinity NT; Medtronic) and a bubble trap (Radnoti, Monrovia, Calif.) (FIG. 1). Sensors allowed for continuous measurement of pressure on the inflow vessels. The livers were perfused with phenol-red Williams' medium E (Sigma-Aldrich, St. Louis, Mo.), supplemented with insulin (5 U/L Humulin R; Eli Lilly & Co, Indianapolis, Ind.), penicillin/streptomycin (40 000 U/L/40 000 μg/L) (Gibco/Invitrogen, Camarillo, Calif.) and 10 mg/L hydrocortisone (Solu-Cortef, Pharmacia & Upjohn, Kalamazoo, Mich.). The complete composition can be found in Table 3. Additional sodium bicarbonate (8.4%) was added to correct a drop in pH after introducing the liver to the system. The solution was oxygenated and buffered with a carbogen mixture of 95% $O_2$/5% $CO_2$, achieving maximum partial oxygen pressure of >700 mmHg and undepleted oxygen outflow (>200 mmHg).

Immediately before connection to the machine perfusion system the donor liver was flushed with 2 L of cold 0.9% NaCl solution through the portal vein and 1 L through the artery. Prior to and following machine perfusion the liver was weighed. The liver was gradually warmed to room temperature (21° C.) over the first hour of perfusion. Donor livers were all perfused for 3 h, a duration chosen following our animal studies that demonstrate full reconstitution of tissue ATP content before 3 h of perfusion [18]. Flow was regulated manually to achieve a target pressure of 4-7 mmHg over the portal vein and 50-80 mmHg on the artery. Resistance was calculated throughout perfusion as the quotient of pressure and flow.

Hepatocellular and Biliary Function and Injury

Perfusate samples were taken frequently in the first half hour and every half hour thereafter. To assess tissue damage, alanine aminotransferase (ALT) and lactate dehydrogenase (LDH) were analyzed. ALT was analyzed using an infinity liquid stable reagent (Cellomics/Thermo Electron, Pittsburgh, Pa.). LDH activity was quantified using a colorimetric assay based on the conversion on $NAD^+$ to NADH (BioVision, Inc., Milpitas, Calif.). Urea and albumin production were measured to assess metabolic and synthetic function. Urea was assayed enzymatically (Cell Biolabs, San Diego, Calif.), and albumin was detected using a Bromocresol Green-based assay (QuantiChrom; BioAssay Systems, Hayward, Calif.). Samples were drawn from the portal venous and arterial inflow and from the caval outflow for half-hourly blood gas analysis (BGA) (Rapidpoint 500; Siemens, Norwood, Mass.). BGA included electrolyte ($Na^+$, $K^+$, $Ca^{2+}$ and $Cl^-$), lactate and glucose concentrations, and acid/base physiology (pH, $pO_2$, $pCO_2$, $HCO_3^-$ and base excess). Oxygen uptake rate (OUR) was calculated by subtracting the oxygen outflow from the combined inflow through the portal vein and hepatic artery ($OUR=(pvO_{2IN}+haO_{2IN})-O_{2OUT}$). The oxygen concentration in each was derived using Henry's law, $C_{dO2}=a_{O2} \times P_{O2}$, where $C_{dO2}$ is the concentration of dissolved oxygen, $a_{O2}$ is the solubility coefficient for oxygen (0.00314 mL $O_2$/mmHg $O_2$/dL) and $P_{O2}$ is the partial oxygen pressure. $pvO_{2IN}/haO_{2IN}$ and $O_{2OUT}$ were calculated by multiplying the $O_2$ concentration by the flow rate, and finally OUR was divided by the weight of the liver.

Wedge biopsies were taken for analysis of tissue ATP content. Prior to homogenization of the tissue, biopsies were pulverized in liquid nitrogen. Pulverized tissue was subsequently analyzed for ATP content using a luminescence-based cell viability assay (BioVision). ATP content was normalized to protein content, measured spectrophotometrically after the reaction with Coomassie dye.

Bile was collected throughout and quantified at 1-h intervals. Alkaline phosphatase (ALP) was measured fluorometrically in the perfusate as a marker of biliary and hepatocellular injury (BioVision). Phospholipids (lecithin, lysolecithin, sphingomyelin) were analyzed in bile using the choline oxidase-DAOS method and measured calorimetrically (Wako Diagnostics, Richmond, Va.). Total bile acids in bile were measured colorimetrically using a commercially available enzymatic kit (BioQuant, San Diego, Calif.). Bile samples were collected under mineral oil to prevent atmospheric equilibration and allow evaluation of bicarbonate and pH of the bile sample.

Histology

Liver parenchyma biopsies were fixed in 10% formalin and transferred to 70% ethylalcohol until processing for light microscopy. After paraffin embedding, samples were sectioned and stained with hematoxylin and eosin (H&E). Samples were assessed by a blinded transplantation pathologist (RNS).

Statistical Analysis

Data were analyzed using Prism 5.0a for Mac OS X (GraphPad software, Inc., La Jolla, Calif.). Data were analyzed for normality using the Kolmogorov-Smirnov normality test. After confirming normality ($\alpha=0.05$), repeated measures analysis of variance with Tukey's posttests were used to analyze time-course parameters. Correlation between two continuous variables was analyzed by simple linear regression, using a t-test to determine whether the regression coefficient differed from 0. Statistical difference between high and low ATP groups was analyzed using a Mann-Whitney U-test for total perfusate release. Results are presented as median (upper-lower quartile). A p-value <0.05 was considered significant.

Results

Donor and Preservation Parameters

Seven consecutively perfused discarded human livers were included in this study, five of which were DCD, with an average relative WIT of 28 (23-34) min (Table 1). Livers were discarded on the basis of prolonged WIT, donor age>45 years in DCD donors, high macrovesicular steatosis and inability to allocate. As minimal dissection of the vasculature was performed on procurement, an average of 70 (63-87) min was needed to prepare the liver for perfusion, resulting in a mean cold ischemic time of 685 (473-871) min.

TABLE 1

Donor and graft characteristics

|  | 1 | 2 | 3 | 4 | 5 | 6 | 7 |
|---|---|---|---|---|---|---|---|
| Donation type (DCD/DBD) | DCD | DCD | DCD | DCD | DBD | DBD | DCD |
| Primary reason for discard | WIT > 30 min | DCD and preoperative LFTs | DCD and donor age | DCD and donor age | Donor age | Steatosis | DCD and donor age |
| Gender | Male | Male | Male | Female | Male | Male | Male |
| Age (years) | 50 | 25 | 50 | 62 | 75 | 24 | 51 |
| BMI | 24.6 | 26.7 | 26.8 | 30.18 | 26 | 52.9 | 26.5 |
| Cause of death | Anoxia | Anoxia | Head trauma | Resp. failure | Head trauma | Anoxia | Anoxia |
| Mechanism of death | Cardiovascular | Asphyxiation | Blunt injury | Natural causes | Blunt injury | Cardiovascular | Cardiovascular |
| Ischemia (min) |  |  |  |  |  |  |  |
| Relative WIT | 54 | 23 | 28 | 94 | N/A | N/A | 20 |

TABLE 1-continued

| Donor and graft characteristics | | | | | | | |
|---|---|---|---|---|---|---|---|
| | 1 | 2 | 3 | 4 | 5 | 6 | 7 |
| Absolute WIT | 10 | 11 | 10 | 18 | N/A | N/A | 11 |
| CIT | 1157 | 1002 | 296 | 740 | 685 | 420 | 525 |
| Macrosteatosis (%) | <10 | <10 | <10 | <10 | 20-30 | 80 | <10 |

CIT, cold ischemia time;
DCD, donation after circulatory death;
DBD, donation after brain death;
LFTs, liver function test;
WIT, warm ischemia time;

Perfusion and Metabolic Parameters During Room-Temperature Machine Perfusion

Figures 2A, 2B, 2C, 2D, 2E, 2F:
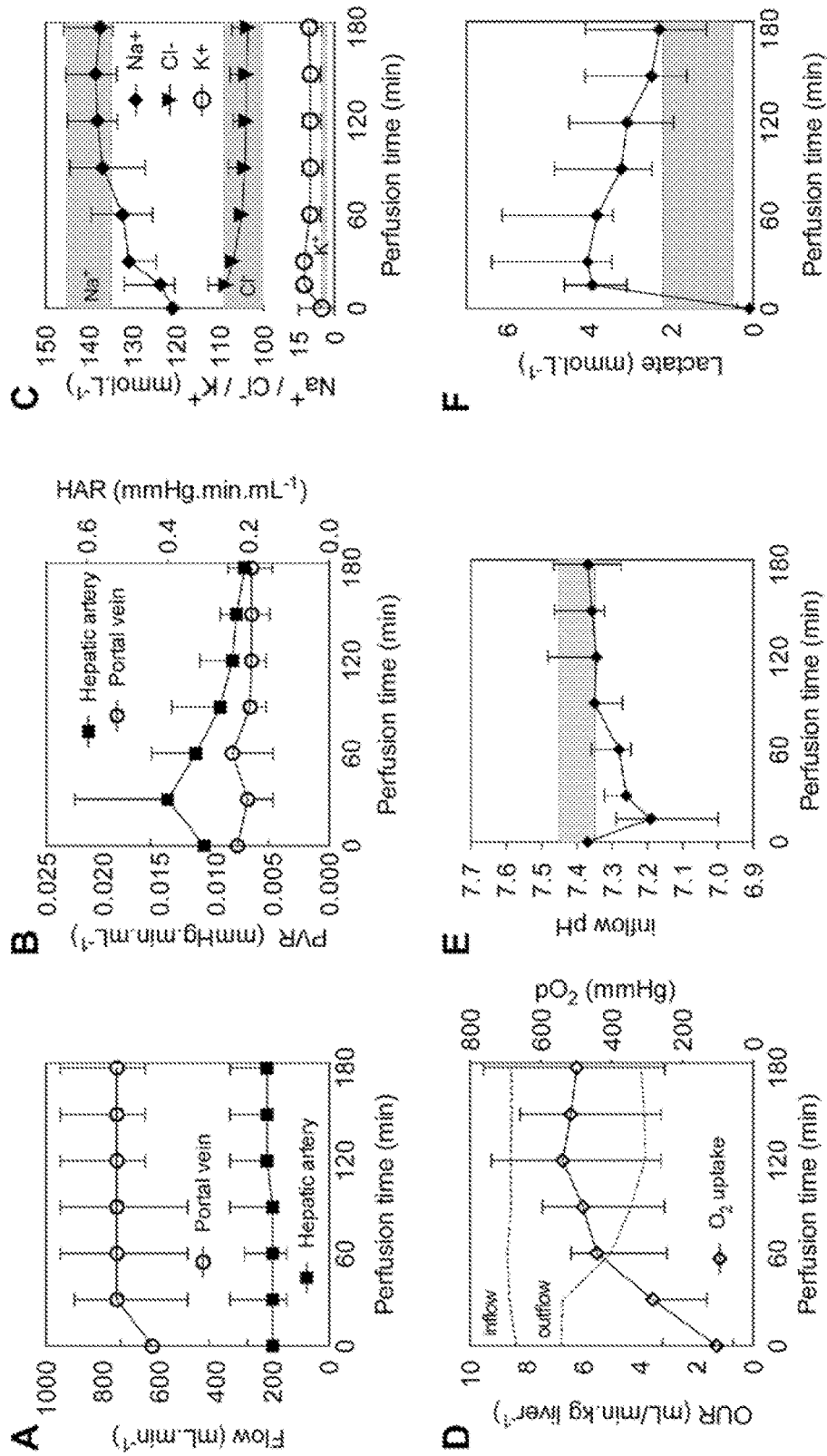
FIGS. 2A-2F is a set of graphs showing perfusion and metabolic dynamics. Development of arterial and portal flow (FIG. 2A) and hepatic arterial (HAR) and portal venous resistance (PVR) (FIG. 2B) during room-temperature machine perfusion.

Once connected to the perfusion system the donor livers warmed up gradually, reaching ambient room air temperature of 20.8±1.0° C. after approximately 60 min. Pressures of 5.8 (4.8-6.2) mmHg on the portal vein and 56 (47-61) mmHg on the artery were maintained by adjusting the flow rates, resulting in an average flow rate of 767 (683-833) mL/min and 206 (195-311) mL/min, respectively (FIG. 2A). Portal resistance was constant throughout perfusion, while the arterial resistance increased in the first 30 min and began to decrease (FIG. 2B). No significant weight change (−0.89 [−5.3 to 2.1]) was observed between the beginning and end of perfusion (p=0.9). Sodium and chloride ion concentrations were in the normal range after 90 and 30 min, respectively, and ended at 137.5 (135.2-143.6) mmol/L and 103.7 (101.2-106.5) mmol/L, while the potassium ion concentration increased initially from a baseline of 5.36 to 12.8 (11.7-13.0) mmol/L and subsequently decreased slightly, and then remained steady and ended at 10.7 (7.25-12.7) mmol/L (FIG. 2C).

Oxygen uptake was immediate and continued to increase during the first 2 h and plateaued thereafter (1.30 [1.11-1.94] to 6.74 [4.15-8.16] mL $O_2$/min per kg liver; p<0.0001) (FIG. 2D). Partial oxygen outflow pressure did not fall below 200 mmHg. In all cases, an initial drop in pH was observed after 15 min, but overall pH returned to within the normal reference range by the second hour (FIG. 2E). Bicarbonate levels increased from 25.4 (24.75-26.04) to 37.0 (33.3-39.5) mmol/L. Glucose increased during the first 90 min and plateaued (final of 341.3 [270.5-490.5] mg/dL). Lactate levels decreased to near normal levels (2.29 [1.20-3.43] mmol/L) after peaking at 30 min (4.04 [3.70-5.99] mmol/L) (FIG. 2F).

Liver Function and Injury During Room-Temperature Machine Perfusion

Figures 3A, 3B, 3C, 3D:
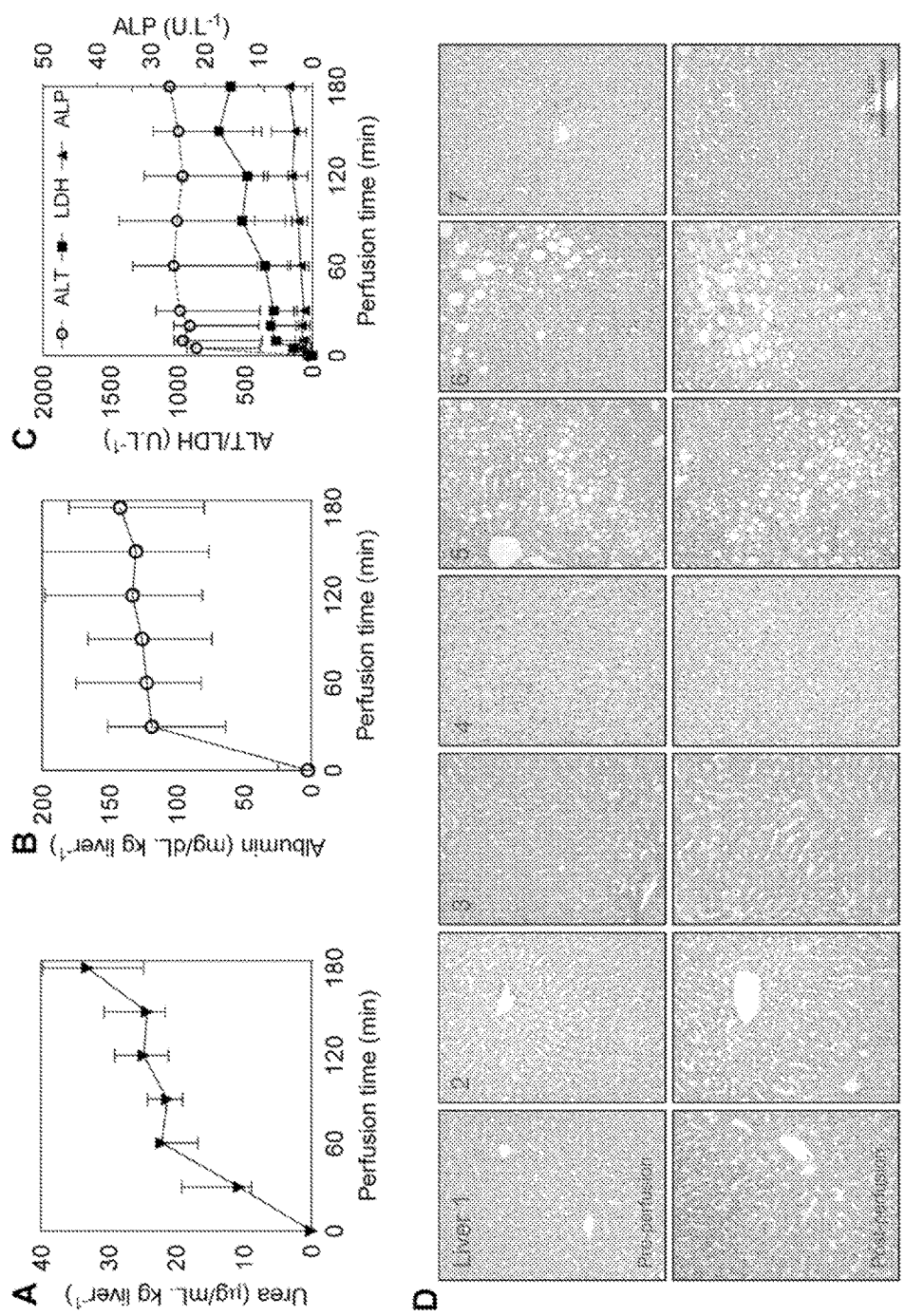
FIGS. 3A-3D is a set of graphs showing hepatic function and injury. Urea production as a biochemical marker of clearance (FIG. 3A), albumin as a synthetic marker (FIG. 3B) and alanine aminotransferase (ALT), lactate dehydrogenase (LDH) and alkaline phosphatase (ALP) as markers of injury (FIG. 3C) and representative hematoxylin and eosin photomicrographs of liver biopsies of the seven perfused livers, before and after perfusion (FIG. 3D). Data presented as median and interquartile range.

Urea production from amino acids in the hepatic urea cycle was constant and totaled 33.12 (27.01-36.79) μg/mL per kg liver at the end of perfusion (FIG. 3A). Total albumin secreted into the perfusate was 142.2 (107.5-175.0) mg/dL per kg liver, with a peak output in the first 30 min, followed by a moderate rate of secretion thereafter (189.7 [151.8-293.4] mg/kg per liver per h) (FIG. 3B). ALT, LDH and ALP were measured as markers of hepatic and biliary injury (FIG. 3C). Substantial ALT release was limited to the first 20 min of perfusion and did not increase significantly thereafter, ending at 1062.1 (750.61-1062.4) U/L. Similarly, only a moderate increase in LDH and ALP was observed. ALP increased mildly during perfusion and most steeply to 2.46 (0.78-4.2) U/L in the first hour.

Histology

Liver biopsies stained with H&E did not show any difference between preperfusion and postperfusion histology (FIG. 3D). Notably, normal hepatocyte morphology was preserved and no evidence of injury to the sinusoidal endothelium was seen after room-temperature machine perfusion. Preperfusion biopsies were consistent with donor characteristics including mild to severe steatosis in livers 5 and 6.

Liver Energy Status (ATP)

Figures 4A, 4B, 4C:
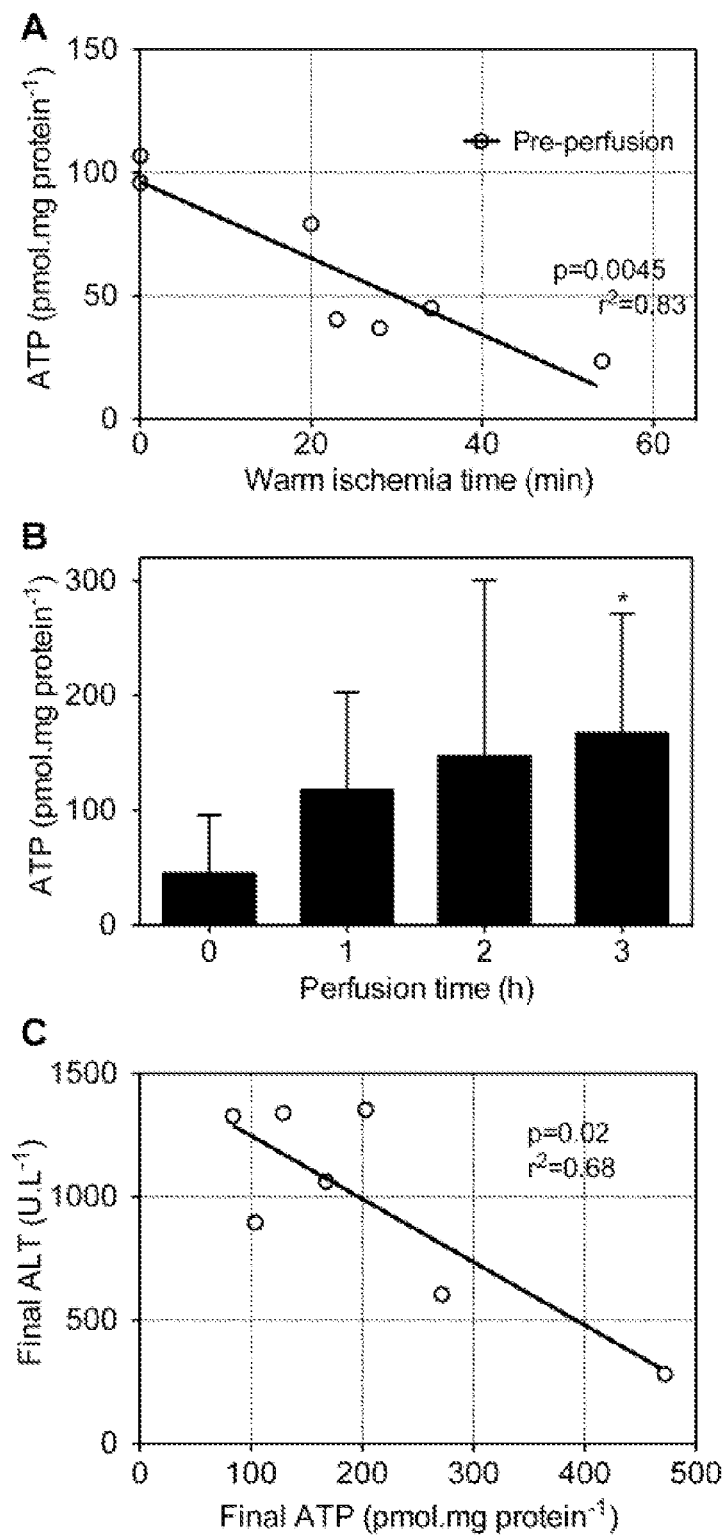
FIGS. 4A-4C show experimental results related to adenosine triphosphate (ATP). Scatterplot of tissue ATP content at the end of cold storage (preperfusion) correlated to relative warm ischemic time (FIG. 4A), tissue ATP content per hour of perfusion (FIG. 4B) and ATP content at the end of perfusion correlated to alanine aminotransferase (ALT) release (FIG. 4C). Data presented as median and interquartile range. *Significantly higher than baseline.
Figure 6:
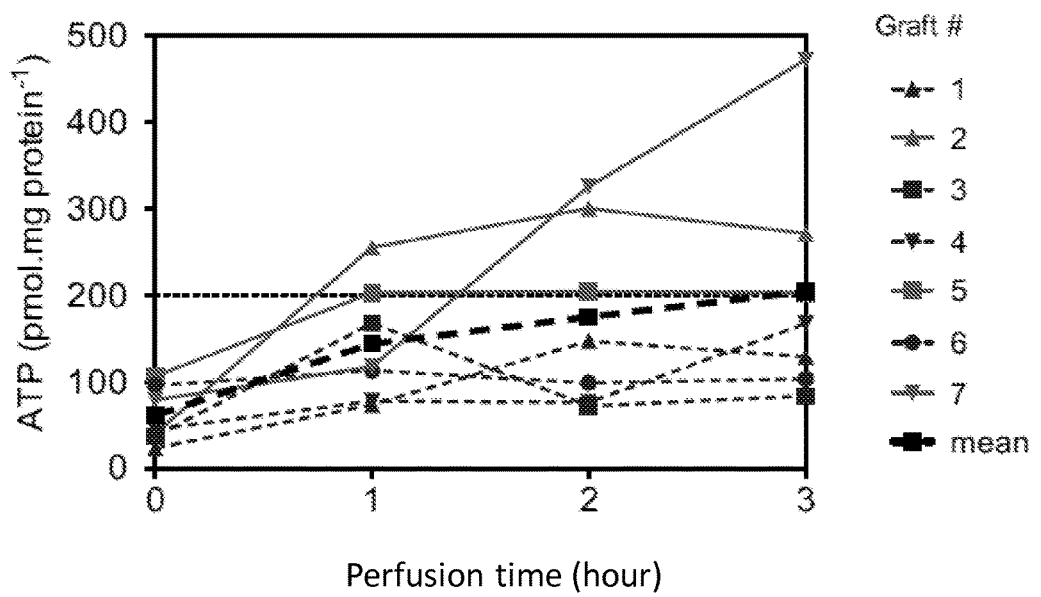
FIG. 6 is a graph showing tissue ATP trends for individual grafts. Solid lines represent liver grafts that have a final ATP content of >200 pmol/mg protein and dashed lines (excluding mean) those that stay below 200 pmol/mg protein.

Tissue ATP content at the end of cold storage correlated negatively with relative WIT (p=0.0045, $r^2$=0.83; FIG. 4A). ATP increased significantly from 45.0 (38.6-87.5) to 167.5 (116.3-237.2) pmol/mg protein (FIG. 4B). By the end of machine perfusion, a 3.7-fold increase in ATP was observed overall (p=0.022). ATP content was correlated to various noninvasive, donor or real-time parameters to determine whether these could be used as surrogates for invasive ATP analysis. ATP recovery was variable between livers (FIG. 6); the tissue ATP content increased to >200 pmol/mg in three of the seven donor livers (Table 2). These livers had significantly higher oxygen uptake (p=0.009) than the other donor livers. Additionally, mean LDH, ALP, ALT, lactate and relative WIT were lower in these high ATP livers compared with the low ATP livers, although this difference was not statistically significant. ATP at the end of perfusion correlated negatively with final ALT values (p=0.02, $r^2$=0.68; FIG. 4C).

TABLE 2

| Comparison between high and low recovered ATP grafts | | | |
|---|---|---|---|
| | High ATP* (n = 3) | Low ATP* (n = 4) | p-Value |
| Donor age (years) | 51 (38-63) | 50 (44-53) | 0.59 |
| Oxygen uptake (mL/kg liver) | 1204 (1129-1282)# | 564.5 (404-760)# | 0.009 |
| Mean arterial resistance (mmHg min/mL) | 0.42 (0.29-0.44) | 0.26 (0.21-0.31) | 0.63 |
| Mean portal resistance (×10$^{-3}$ mmHg min/mL) | 5.7 (5.4-7.5) | 8.2 (6.9-9.9) | 0.86 |
| Peak lactate (mmol/L) | 3.95 (3.70-4.00) | 6.10 (5.06-6.66) | 0.4 |
| ALT release (U/L) | 604.7 (443.2-979.2) | 1194.9 (1020.7-1330.9) | 0.62 |
| ALP release (U/L) | 1.32 (1.25-5.16) | 5.12 (3.38-7.18) | 0.86 |
| LDH release (U/L) | 190.0 (173.3-535.0) | 660 (526.7-1018) | 0.4 |
| Urea output (μg/mL per kg liver) | 33.12 (31.2-47.5) | 29.3 (23.7-35.3) | 0.62 |
| Albumin output (mg/dL per kg liver) | 135.5 (94.1-138.9) | 175.0 (147.3-190.0) | 0.23 |

TABLE 2-continued

Comparison between high and low recovered ATP grafts

|  | High ATP* (n = 3) | Low ATP* (n = 4) | p-Value |
|---|---|---|---|
| Relative WIT (min) | 21 (20-22) | 34 (31-44) | 0.28 |
| CIT (h) | 11.4 (10.1-14.1) | 9.7 (6.5-14.1) | 0.86 |

ALP, alkaline phosphatase;
ALT, alanine aminotransferase;
ATP, adenosine triphosphate;
CIT, cold ischemia time;
LDH, lactate dehydrogenase;
WIT, warm ischemia time.
*High (>200 pmol/mg protein) and low (<200 pmol/mg protein) ATP content postperfusion;
AUC = area under the curve.

Biliary Function

Figures 5A, 5B, 5C, 5D:
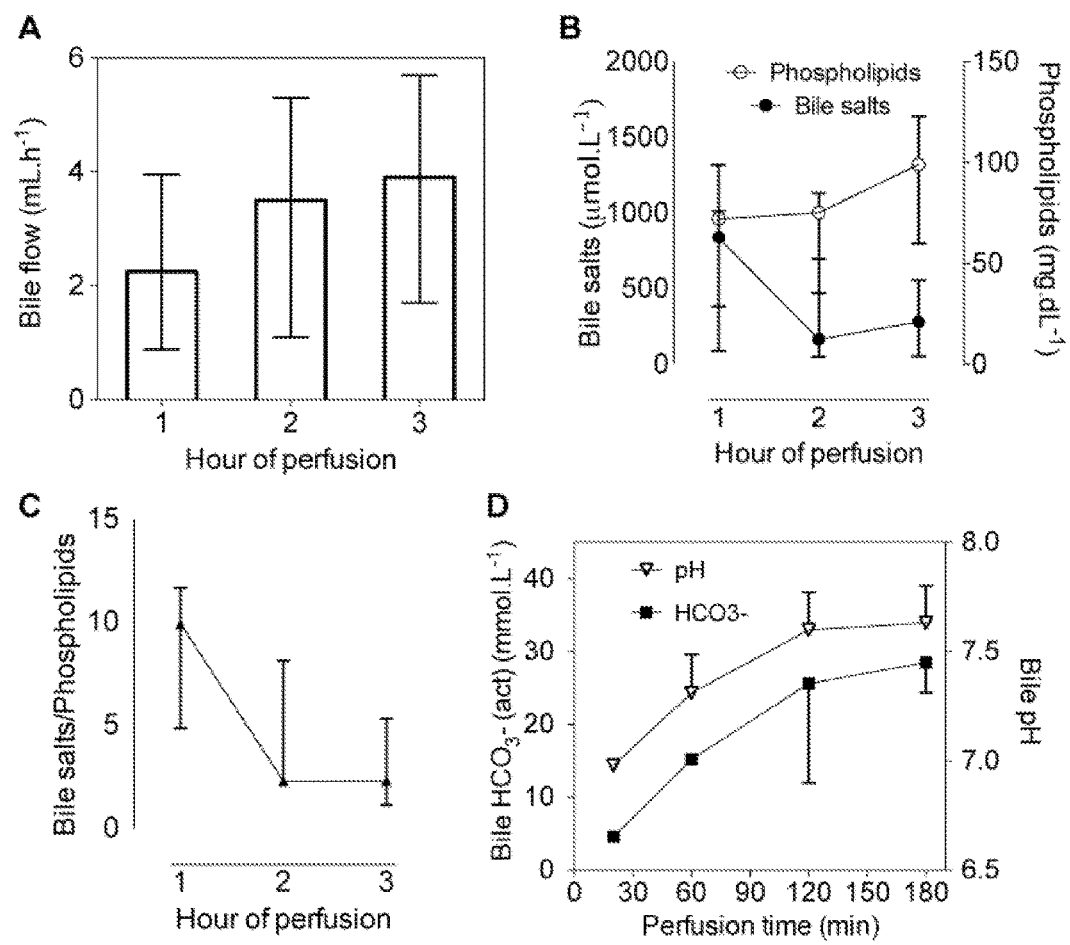
FIGS. 5A-5D is a set of graphs showing biliary parameters. Bile flow measured for every hour of perfusion (FIG. 5A), the concentration of bile salts and phospholipids in the bile (FIG. 5B), as well as the bile salt to phospholipid ratio (FIG. 5C) and the bicarbonate concentration and pH of bile during perfusion (FIG. 5D). Data presented as median and interquartile range.

Bile flow generally started within the first 30 min of perfusion. Total bile production in the first hour was 2.25 (0.9-2.5) mL, which increased to 3.9 (2.4-5.1) mL in the final hour (FIG. 5A). Absence of an enterohepatic circulation of bile salts resulted in a decrease in biliary bile salt concentration from the first hour (FIG. 5B). Total phospholipid concentration increased throughout perfusion, which resulted in a lower and less toxic bile salt to phospholipid ratio (FIG. 5C). The secretion of cytoprotective bicarbonate increased favorably, which also raised the pH from 6.9 early in perfusion to a more alkaline pH of 7.6 at the end of perfusion (FIG. 5D).

DISCUSSION

It is demonstrated herein that human livers can be supported ex vivo by room-temperature machine perfusion at room temperature. During this ex vivo period the liver is metabolically active, demonstrating synthetic and clearance function, while incurring minimal additional injury. Furthermore, this study shows that room-temperature machine perfusion can improve various functional and biochemical parameters after a period of extensive warm and cold ischemia, including a significant improvement in oxygen uptake, bile production and tissue ATP content.

Room-temperature machine perfusion likely operates through a number of cooperative mechanisms. Restoration of mitochondrial respiratory function and reversal of energy deficits have been shown to be pivotal in restoring liver viability [20, 21]. Mitochondria play a key role in ischemia/reperfusion injury through their role in reactive oxygen species formation and the induction of apoptosis [22, 23]. In this work, particular attention has been paid to improvement of the energy balance of the liver. Impairment of oxidative phosphorylation during warm hypoxia leads to a rapid dephosphorylation of ATP, which is only exacerbated during hypothermic preservation [18, 24]. As a result the ischemic liver is poorly prepared for warm reperfusion and the oxidative and inflammatory stress that follows. Improvement of mitochondrial condition, reflected here by augmentation of tissue ATP content, an increasing consumption of oxygen and decreasing lactate levels during room-temperature machine perfusion, may result in the improved tolerance to oxidative stress seen on reperfusion in animal studies [25]. Recovered levels of ATP appear to be a good indicator of mitochondrial respiratory function, as high ATP content at the end of room-temperature machine perfusion is correlated to higher oxygen uptake and lower lactate levels during perfusion. Moreover, the ability of the liver to recover ATP seems to depend on the severity of the injury sustained during ischemia. Livers with a poor recovery of ATP were subjected to a longer WIT and showed worse liver function tests (LFTs) during room-temperature machine perfusion. Conversely, clinical studies have shown that preimplantation ATP content correlates to liver failure [26] and postreperfusion ATP recovery to posttransplant function [27]. In various animal studies, it has been demonstrated that ATP content correlates to the number viable cells [28, 29] and it has been found that postperfusion ATP content is highly suggestive of outcome in transplant models [18, 30].

Additional mechanisms of action may include the normalization of ion and metabolite balances through equilibration with the perfusion solution, which produces a more adequate environment for warm reperfusion. Microcirculatory obstructions, originating from either microthrombi or cellular edema, may be of underappreciated importance and prevent adequate tissue perfusion. Improving sinusoidal conductance prior to transplantation increases the rate of graft recovery [31].

Discussions concerning the optimum phase during the ex vivo period for the application of machine perfusion are ongoing [32]. Various groups have considered long perfusion times, aiming to replace static cold preservation entirely and have shown success [33-35]. It has been shown in a porcine model that even a short period of cold preservation prior to warm perfusion has adverse effects on function and injury of the liver, suggesting that perfusion may benefit from immediate initiation on recovery [24, 36]. Warm perfusion that spans the transport period has been approached with rightful trepidation, namely considering the risk of equipment failure. Moreover, resource and personnel demands of long-term machine perfusion would make implementation of preservation-spanning perfusions arduous. However, new devices are gaining support and may play a role in the near future [37]. Postprocurement machine perfusion, particularly in the case of DCD livers, offers a recovery phase prior to cold preservation that may improve tolerance to extended cold ischemia [38]. It was previously shown that ATP can be recovered to baseline levels after 3 h of perfusion, a duration that is compatible with the logistics of transplantation [18]. Learning from clinical experience, various parameters in perfusion can be considered as indicators of liver function or injury and include standard LFTs, bile production and other hepatic synthetic functions [39, 40]. Detailed analyses of metabolism can be used to provide accurate criteria for liver viability. By applying dynamic discriminate analyses, Perk et al [12] have identified metabolites measured during perfusion that discriminate between warm ischemic and fresh livers with a very high specificity. Moreover, using easily measured metabolites like glucose, urea and lactate, indices for transplantation can be constructed that predict transplant success with equally high specificity [13].

Although the importance of preserving and assessing hepatocellular viability is indisputable, progress toward expanding the current donor pool cannot occur without advances in biliary preservation. Bile duct complications remain a limiting factor in the use of DCD livers, with particularly high incidences of nonanastomotic biliary strictures [41]. With ischemia as the primary risk factor for biliary complications, room-temperature machine perfusion may provide an elegant solution, minimizing further injury and providing a platform for treatment. Additionally, bile salt toxicity has been proposed as a factor in bile duct injury. A compositional change in bile salt to phospholipid ratio has been associated with bile duct injury in clinical studies [42, 43]. Moreover, a shift to dominantly toxic, hydrophobic bile salts may play an important role [44]. It may prove beneficial to supplement the depletion of bile salts observed in this and other work with protective hydrophilic bile salts [45]. Room-temperature machine perfusion and other warm machine perfusion systems have already proven advantageous in reducing markers of biliary injury during preservation and restoring normal biliary physiology [14, 46]. In this work, machine perfusion's ability to rectify various compositional disturbances in bile is confirmed. Moreover, room-temperature machine perfusion results in a less toxic and more protective composition of bile through changes in bile salt, phospholipid and bicarbonate concentrations [47, 48].

The precise constituents and setting for optimal machine perfusion of the liver remain uncertain. While simplicity and minimal risk have driven the development of hypothermic systems, NMP has sparked interest in the prospect of an ex vivo organ with close to normal physiology that opens up the opportunity for intervention, recovery and viability testing [14, 49]. The complexity and associated risk have delayed clinical implementation and have even veered groups away. In developing this room-temperature machine perfusion system, emphasis has been laid on simplicity while maintaining the goal of developing an effective system for liver recovery and assessment. With regard to efficacy, room-temperature machine perfusion has already shown excellent results in both hepatic and biliary preservation.

In this feasibility study, it has been demonstrated that room-temperature machine perfusion effectively supports the human liver ex vivo with minimal injury, stable if not improved metabolic activity, and normalized physiological disturbances postischemia. Moreover, room-temperature machine perfusion provides an environment for restoring the hepatic energy status, reflecting a recovery of mitochondrial function. This work is the first demonstration of the capacity of room-temperature machine perfusion to sustain human livers and supports previous experimental work that suggest a pivotal role of machine perfusion in expanding the use of currently discarded livers for transplantation.

TABLE 3

| Perfusate composition | |
| --- | --- |
| | g/L |
| Inorganic Salts | |
| Calcium Chloride | 0.2 |
| Cupric Sulfate•5H$_2$O | 0.0000001 |
| Ferric Nitrate•9H$_2$O | 0.0000001 |
| Magnesium Chloride•4H$_2$O | 0.0000001 |
| Magnesium Sulfate (anhydrous) | 0.0977 |
| Potassium Chloride | 0.4 |
| Sodium Bicarbonate | 2.2 |
| Sodium Chloride | 6.8 |
| Sodium Phosphate Monobasic (anhydrous) | 0.122 |
| Zinc Sulfate•7H$_2$O | 0.0000002 |
| Amino Acids | |
| L-Alanine | 0.09 |
| L-Arginine (free base) | 0.05 |
| L-Asparagine•H$_2$O | 0.02 |
| L-Aspartic Acid | 0.03 |
| L-Cysteine (free acid) | 0.04 |
| L-Cystine | 0.02 |
| L-Glutamic Acid | 0.0445 |
| L-Glutamine | 0.292 |
| Glycine | 0.05 |
| L-Histidine (free base) | 0.015 |
| L-Isoleucine | 0.05 |

TABLE 3-continued

| Perfusate composition | |
| --- | --- |
| | g/L |
| L-Leucine | 0.075 |
| L-Lysine•HCl | 0.08746 |
| L-Methionine | 0.015 |
| L-Phenylalanine | 0.025 |
| L-Proline | 0.03 |
| L-Serine | 0.01 |
| L-Threonine | 0.04 |
| L-Tryptophan | 0.01 |
| L-Tyrosine•2Na•2H$_2$O | 0.05045 |
| L-Valine | 0.05 |
| Vitamins | |
| Ascorbic Acid•Na | 0.00227 |
| D-Biotin | 0.0005 |
| Calciferol | 0.0001 |
| Choline Chloride | 0.0015 |
| Folic Acid | 0.001 |
| myo-Inositol | 0.002 |
| Menadione (sodium bisulfite) | 0.00001 |
| Niacinamide | 0.001 |
| D-Pantothenic Acid (hemicalcium) | 0.001 |
| Pyridoxal•HCl | 0.001 |
| Retinol Acetate | 0.0001 |
| Riboflavin | 0.0001 |
| Thiamine•HCl | 0.001 |
| DL-α-Tocopherol Phosphate•Na | 0.00001 |
| Vitamin B12 | 0.0002 |
| Other | |
| D-Glucose | 2 |
| Glutathione (reduced) | 0.00005 |
| Methyl Linoleate | 0.00003 |
| Phenol Red•Na | 0.0107 |
| Pyruvic Acid•Na | 0.025 |
| Penicillin (U/L) | 40,000 |
| Streptomycin | 0.04 |
| Humulin R (U/1/hr) | 2 |
| Hydrocortisone | 0.01 |
| Sodium Bicarbonate (8.4%) | 30-50 mL |

REFERENCES FOR EXAMPLE 1

1. Jain A, Reyes J, Kashyap R, et al. Long-term survival after liver transplantation in 4,000 consecutive patients at a single center. Ann Surg 2000; 232: 490-500.
2. McCormack L, Petrowsky H, Jochum W, Mullhaupt B, Weber M, Clavien P A. Use of severely steatotic grafts in liver transplantation: A matched case-control study. Ann Surg 2007; 246: 940-946, discussion 946-948.
3. Moore D E, Feurer I D, Speroff T, et al. Impact of donor, technical, and recipient risk factors on survival and quality of life after liver transplantation. Arch Surg 2005; 140: 273-277.
4. de Vera M E, Lopez-Solis R, Dvorchik I, et al. Liver transplantation using donation after cardiac death donors: Long-term follow-up from a single center. Am J Transplant 2009; 9: 773-781.
5. de Rougemont O, Breitenstein S, Leskosek B, et al. One hour hypothermic oxygenated perfusion (HOPE) protects nonviable liver allografts donated after cardiac death. Ann Surg 2009; 250: 674-683.
6. Bessems M, Doorschodt B M, van Marle J, Vreeling H, Meijer A J, van Gulik T M. Improved machine perfusion preservation of the non-heart-beating donor rat liver using polysol: A new machine perfusion preservation solution. Liver Transpl 2005; 11: 1379-1388.

7. Monbaliu M, Liu L, Libbrecht L, et al. Preserving morphology and evaluating quality of liver grafts by hypothermic machine perfusion, a proof of concept study using discarded human livers. Liver Transpl 2012; 18: 1495-1507.
8. Schlegel A, Graf R, Clavien P A, Dutkowski P. Hypothermic oxygenated perfusion (HOPE) protects from biliary injury in a rodent model of DCD liver transplantation. J Hepatol 2013; 59: 984-991.
9. Guarrera J V, Henry S D, Samstein B, et al. Hypothermic machine preservation in human liver transplantation: The first clinical series. Am J Transplant 2010; 10: 372-381.
10. Dutkowski P, et al., HOPE for human liver grafts obtained from donors after cardiac death. J Hepatol 2014; 60: 765-772.
11. Xu H, Berendsen T, Kim K, et al. Excorporeal normothermic machine perfusion resuscitates pig DCD livers with extended warm ischemia. J Surg Res 2011; 43: 1484-1488.
12. Perk S, Izamis M L, Tolboom H, et al. A metabolic index of ischemic injury for perfusion-recovery of cadaveric rat livers. PLoS ONE 2011; 6: e28518.
13. Perk S, Izamis M L, Tolboom H, Uygun B, Yarmush M L, Uygun K. A fitness index for machine-perfused cadaveric rat livers. BMC Res Notes 2012; 5: 325.
14. Op den Dries S, Karimian N, Sutton M E, et al. Ex vivo normothermic machine perfusion and viability testing of discarded human donor livers. Am J Transplant 2013; 13: 1327-1335.
15. Minor T, Efferz P, Fox M, Wohlschlaeger J, Lu¨er B. Controlled oxygenated rewarming of cold stored liver grafts by thermally graduated machine perfusion prior to reperfusion. Am J Transplant 2013; 13: 1450-1460.
16. Shigeta T, Matsuno N, Obara H, et al. Impact of rewarming preservation by continuous machine perfusion: Improved post-transplant recovery in pigs. Transplant Proc 2013; 45: 1684-1689.
17. VajdovaK, Graf R, Clavien P A. ATP-supplies in the cold-preserved liver: A long-neglected factor of organ viability. Hepatology 2002; 36: 1543-1552.
18. Berendsen T A, Bruinsma B G, Lee J, et al. A simplified subnormothermic machine perfusion system restores ischemi-cally damaged liver grafts in a rat model of orthotopic liver transplantation. Transplant Res 2012; 1: 6.
19. Tolboom H, Pouw R, Uygun K, et al. A model for normothermic preservation of the rat liver. Tissue Eng 2007; 13: 2143-2151.
20. Luer B, Koetting M, Efferz P, Minor T. Role of oxygen during hypothermic machine perfusion preservation of the liver. Transpl Int 2010; 23: 944-950.
21. Mitchell S J, Churchill T A, Winslet M C, Fuller B J. Energy metabolism following prolonged hepatic cold preservation: Bene¬fits of interrupted hypoxia on the adenine nucleotide pool in rat liver. Cryobiology 1999; 39: 130-137.
22. Zhao K, Zhao G M, Wu D, et al. Cell-permeable peptide antioxidants targeted to inner mitochondrial membrane inhibit mitochondrial swelling, oxidative cell death, and reperfusion injury. J Biol Chem 2004; 279: 34682-34690.
23. McCord J M. Oxygen-derived free radicals in postischemic tissue injury. N Engl J Med 1985; 312: 159-163.
24. Reddy S P, Bhattacharjya S, Maniakin N, et al. Preservation of porcine non-heart-beating donor livers by sequential cold storage and warm perfusion. Transplantation 2004; 77: 1328-1332.
25. Ferrigno A, Rizzo V, Boncompagni E, et al. Machine perfusion at 20° C. reduces preservation damage to livers from non-heart beating donors. Cryobiology 2011; 62: 152-158.
26. Lanir A, Jenkins R L, Caldwell C, Lee R G, Khettry U, Clouse M E. Hepatic transplantation survival: Correlation with adenine nucleo¬tide level in donor liver. Hepatology 1988; 8: 471-475.
27. Kamiike W, Burdelski M, Steinhoff G, Ringe B, Lauchart W, Pichlmayr R. Adenine nucleotide metabolism and its relation to organ viability in human liver transplantation. Transplantation 1988; 45: 138-143.
28. Usta O B, He X, Kim Y, et al. Supercooling as a viable non-freezing cell preservation method of rat hepatocytes. PLoS ONE 2013; 8: e69334.
29. Berendsen T A, Izamis M L, Xu H, et al. Hepatocyte viability and adenosine triphosphate content decrease linearly over time during conventional cold storage of rat liver grafts. Transplant Proc 2011; 43: 1484-1488.
30. Bruinsma B G, Berendsen T A, Izamis M L, Yarmush M L, Uygun K. Determination and extension of the limits to static cold storage using subnormothermic machine perfusion. Int J Artif Organs 2013; 36: 775-780.
31. Minor T, Tolba R, Neumann S, Schulz S, Sitzia M. Fibrinolysis in organ procurement for transplantation after cardiocirculatory compromise. Thromb Haemost 2003; 90: 361-362.
32. Koetting M, Minor T. Donation after cardiac death: Dynamic graft reconditioning during or after ischemic preservation? Artif Organs 2011; 35: 565-571.
33. St Peter S D, Imber C J, Lopez I, Hughes D, Friend P J. Extended preservation of non-heart-beating donor livers with normothermic machine perfusion. Br J Surg 2002; 89: 609-616.
34. Butler A J, Rees M A, Wight D G D, et al. Successful extracorporeal porcine liver perfusion for 72 hr. Transplantation 2002; 73: 1212-1218.
35. Bessems M, Doorschodt B M, Dinant S, de Graaf W, van Gulik T M. Machine perfusion preservation of the pig liver using a new preservation solution, polysol. Transplant Proc 2006; 38: 1238-1242.
36. Reddy S, Greenwood J, Maniakin N, et al. Non-heart-beating donor porcine livers: The adverse effect of cooling. Liver Transpl 2005; 11: 35-38.
37. van der Plaats A, Maathuis M H, 'T Hart N A, et al. The Groningen hypothermic liver perfusion pump: Functional evaluation of a new machine perfusion system. Ann Biomed Eng 2006; 34: 1924-1934.
38. Miyagi S, Iwane T, Akamatsu Y, Nakamura A, Sato A, Satomi S. The significance of preserving the energy status and microcircula-tion in liver grafts from non-heart-beating donor. Cell Transplant 2008; 17: 173-178.
39. Friend P J, Imber C, St Peter S, Lopez I, Butler A J, Rees M A. Normothermic perfusion of the isolated liver. Transplant Proc 2001; 33: 3436-3438.
40. VajdovOK, SmrekovOR, MislanovOC, Kukan M, LutterovOM. Cold-preservation-induced sensitivity of rat hepatocyte function to rewarming injury and its prevention by short-term reperfusion. Hepatology 2000; 32: 289-296.
41. Wojcicki M, Milkiewicz P, Silva M. Biliary tract complications after liver transplantation: A review. Dig Surg 2008; 25: 245-257.
42. Geuken E, Visser D, Kuipers F, et al. Rapid increase of bile salt secretion is associated with bile duct injury after human liver transplantation. J Hepatol 2004; 41: 1017-1025.

43. Buis C I, Geuken E, Visser D S, et al. Altered bile composition after liver transplantation is associated with the development of nonanastomotic biliary strictures. J Hepatol 2009; 50: 69-79.
44. Hertl M, Harvey P R, Swanson P E, et al. Evidence of preservation injury to bile ducts by bile salts in the pig and its prevention by infusions of hydrophilic bile salts. Hepatology 1995; 21: 1130-1137.
45. Imber C J, St Peter S D, de Cenarruzabeitia I L, et al. Optimisation of bile production during normothermic preservation of porcine livers. Am J Transplant 2002; 2: 593-599.
46. Vairetti M, Ferrigno A, Rizzo V, et al. Correlation between the liver temperature employed during machine perfusion and reperfusion damage: Role of Ca2þ. Liver Transpl 2008; 14: 494-503.
47. Hoekstra H, Porte R J, Tian Y, et al. Bile salt toxicity aggravates cold ischemic injury of bile ducts after liver transplantation in mdr2þ/mice. Hepatology 2006; 43: 1022-1031.
48. Hohenester S, Wenniger L M, Paulusma C C, et al. A biliary HCO3 umbrella constitutes a protective mechanism against bile acid-induced injury in human cholangiocytes. Hepatology 2012; 55: 173-183.
49. Brockmann J, Reddy S, Coussios C, et al. Normothermic perfusion: A new paradigm for organ preservation. Ann Surg 2009; 250: 1-6.
50. Tolboom H, Izamis M L, Sharma N, et al. Subnormothermic machine perfusion at both 20° C. and 30° C. recovers ischemic rat livers for successful transplantation. J Surg Res 2011; 175: 149-156.

Example 2: Organ Preservation Bag

The preservation bag is comprised primarily of the same material used to produce Baxter saline bags (e.g. Sealed Air).

The perfusion is operated at room temperature, so no temperature control is needed.

The system is a closed system without air. In the event of bubbles, it functions as a bubble trap (any bubbles float). These can be siphoned off with a syringe and a rubber-stop or squeezing them out a valve (e.g. luer-lock stopcock).

From the top-view the design can be circular or square, depending on how the other components (e.g. oxygen tank, pumps) fit, thereby conferring stability on the bag.

From the side view, the bag is flimsy at the bottom and top because the bag is arced—this becomes more rigid when filled with perfusate.

The shape is determined by a stiff outer ring that has some height associated with it.

The height of the ring is determined primarily by the size and composition of the inner tubes that carry perfusate from the top of the device to the bottom. The tubes are oxygen-permeable, functioning as large-surface area oxygenators.

If the tubes are comprised of silicon tubing (or the same material the rest of the bag is made out of), which forms a holey floor of the organ chamber (top of the device) they could be large enough to enable flow to gravitate into the bottom chamber, minimizing the work needed to be done by the pumps to pull the fluid through. If the sizes of the holes need to be very small in order to minimize liver bed sores, the shape of the tubes can taper out, increasing in diameter, possibly even joining, at the bottom of the bag.

Alternatively, the oxygenator could comprise the same microfibers as dialyzers (e.g. Gambro), with the potting compound/glue forming the seat in which the liver sits.

The oxygen tank is connected to the outer ring, either sitting in a pocket within the ring if it is large enough, or attached outside to the ring. The ring is sealed from top to bottom, but on the opposite end of the oxygenator (across the device) there is a small release hole for the oxygen to escape.

There are two pumps (e.g. Quantex pumps) that suck perfusate from the bottom of the bag (and therefore, through the oxygenator-fibers/tubes, into the HA and PV. The pumps are preset to ensure the pressure out is within physiological range (up to 100 mmHg in the HA and 5 mmHg in the PV). They fit in the space afforded by the ring.

The PV and HA are hooked up to the pumps using valved quick disconnects.

The bile duct is cannulated (e.g. 14G Terumo catheter) and securely fasted to a large vacutainer tube (e.g. 50 ml) which is embedded with the space afforded by the ring.

There is a water-tight zip that opens a large flap at the top of the device to allow the liver to be immersed in the system.

The tubing to insert into the vasculature is attached to the zip flap to enable access when influx samples need to be procured and to measure pressure (e.g. Biopac system).

A similar attachment to the IVC is made to enable outflow measurements or a rubber stop is placed in the vicinity of the IVC for a catheter or syringe to be inserted into through the bag.

To use the preservation bag, the following protocol can be used: (1) At procurement, the liver is immediately pre-flushed with 1-2 L of modified Williams Medium E35, using valved quick disconnects. (2) The liver is disconnected from the flush and placed into the organ preservation bag and snapped on to the pump quick disconnects. (3) The oxygen is turned on. (4) The pumps are initiated at low flow rates, ramped up slowly to optimal flow in the first 30 minutes of perfusion. (5) The bile tubing is inserted into a vacutainer. (6) Once the system is stable, the zip is closed and air removed. (7) Perfusion is evaluated using dynamic contrast enhanced ultrasound directly on the bag, and samples are taken from in- and outlets.

What is claimed is:

1. An organ perfusion system operating at room temperature, the system comprising
    an organ preservation container configured to encase an organ removed from a subject and store a perfusion fluid, whereby the organ is at least partially immersed in the perfusion fluid;
    a fluidic circuit system having a first end connected to the perfusion fluid stored in the organ preservation container and a second end connected to the organ, the fluidic circuit system configured to draw the perfusion fluid through the first end and perfuse the organ with the perfusion fluid, and wherein the organ perfusion system does not comprise a temperature controller,
    wherein the fluidic circuit system comprises one or more components,
    wherein at least one of the one or more components is at least partially immersed in the perfusion fluid,
    wherein the organ comprises a first blood vessel and a second blood vessel, and the fluidic circuit system comprises: (a) a first fluidic circuit connected to the first blood vessel and configured to flow a first perfusion fluid through the first blood vessel; and (b) a second fluidic circuit connected to the second blood vessel and configured to flow a second perfusion fluid through the second blood vessel, and
    wherein the first fluidic circuit and the second fluidic circuit share a common fluidic pathway.

2. The organ perfusion system of claim 1, wherein the organ perfusion system does not comprise a cleaning device for cleaning the perfusion fluid.

3. The organ perfusion system of claim 1, wherein the organ perfusion system is portable.

4. The organ perfusion system of claim 1, wherein the fluidic circuit system comprises a pressure sensor configured to measure a pressure of the perfusion fluid flowing towards the organ.

5. The organ perfusion system of claim 4, wherein the fluidic circuit system comprises a pump configured to control a pressure of the perfusion fluid as a function of a measurement of the pressure sensor.

6. The organ perfusion system of claim 1, wherein the fluidic circuit system comprises an oxygenator configured to increase oxygen level in the perfusion fluid flowing towards the organ.

7. The organ perfusion system of claim 1, wherein the fluidic circuit system comprises a bubble-removing device configured to remove bubbles from the perfusion fluid flowing towards the organ.

8. The organ perfusion system of claim 1, wherein the organ is selected from the group consisting of liver, pancreas, kidney, spleen, heart, lung, and a vascular composite tissue that can be cannulated for perfusion.

9. The organ perfusion system of claim 1, wherein the perfusion fluid is a rich and defined medium.

10. The organ perfusion system of claim 1, wherein the perfusion fluid comprises Williams' medium E.

11. The organ perfusion system of claim 1, wherein the perfusion fluid further comprises insulin, one or more antibiotics, hydrocortisone, or any combinations thereof.

12. The organ perfusion system of claim 1, wherein the perfusion fluid does not comprise red blood cells.

13. The organ perfusion system of claim 1, further comprising a second container connected to the organ and configured to collect a product produced by the organ.

14. A method of preserving an organ, the method comprising connecting the organ to the organ perfusion system of claim 1 to perfuse the organ.

15. A method of preventing ischemic damage in an organ, the method comprising connecting the organ to the organ perfusion system of claim 1 to perfuse the organ.

16. The organ perfusion system of claim 1, wherein the organ comprises a portal vein and an artery, and the fluidic circuit system comprises: (a) a first fluidic circuit connected to the portal vein and configured to flow a first perfusion fluid through the portal vein; and (b) a second fluidic circuit connected to the artery and configured to flow a second perfusion fluid through the artery, and wherein the first fluidic circuit and the second fluidic circuit share a common fluidic pathway.

17. The organ perfusion system of claim 16, wherein the first fluidic circuit is independently controlled from the second fluidic circuit.

18. The organ perfusion system of claim 16, wherein a pressure of the first perfusion fluid is in the range of 1-10 mmHg.

19. The organ perfusion system of claim 16, wherein a pressure of the second perfusion fluid is in the range of 20-120 mmHg.

20. The organ perfusion system of claim 16, wherein the first fluidic circuit and the second fluidic circuit share an oxygenator, a bubble-removing device, or a pressure sensor.

* * * * *